United States Patent
Kusunoki et al.

(10) Patent No.: US 7,571,969 B2
(45) Date of Patent: Aug. 11, 2009

(54) IMAGE FORMING APPARATUS AND DROPLET EJECTION CONTROL METHOD

(75) Inventors: Naoki Kusunoki, Kanagawa (JP);
Tadahisa Sato, Minami-Ashigara (JP);
Hideki Maeta, Minami-Ashigara (JP);
Yuki Shimizu, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 469 days.

(21) Appl. No.: 11/365,932

(22) Filed: Mar. 2, 2006

(65) Prior Publication Data

US 2006/0197787 A1   Sep. 7, 2006

(30) Foreign Application Priority Data

Mar. 4, 2005 (JP) ............................... 2005-060737

(51) Int. Cl.
*B41J 29/38* (2006.01)
(52) U.S. Cl. .............................. 347/9; 347/10; 347/100
(58) Field of Classification Search ................. 347/100, 347/95, 96, 101, 15, 8, 9, 84, 85, 10, 14, 347/19
See application file for complete search history.

(56) References Cited

U.S. PATENT DOCUMENTS

| 5,923,348 | A | 7/1999 | Cunnagin et al. |
| 6,172,689 | B1 | 1/2001 | Cunnagin et al. |
| 6,527,354 | B2 * | 3/2003 | Takahashi ...................... 347/9 |
| 6,582,508 | B2 | 6/2003 | Dietz et al. |
| 7,216,947 | B2 * | 5/2007 | Kusunoki ..................... 347/10 |
| 2005/0062774 | A1 | 3/2005 | Kusunoki |
| 2005/0109240 | A1 | 5/2005 | Maeta et al. |

FOREIGN PATENT DOCUMENTS

| JP | 3-247450 A | 11/1991 |
| JP | 10-250059 A | 9/1998 |
| JP | 2002-146222 A | 5/2002 |

* cited by examiner

*Primary Examiner*—Manish S Shah
(74) *Attorney, Agent, or Firm*—Birch, Stewart, Kolasch & Birch, LLP

(57) ABSTRACT

The image forming apparatus includes a recording head which ejects droplets of a liquid onto a recording medium, the liquid containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow.

11 Claims, 17 Drawing Sheets

SUB-SCANNING DIRECTION
(PAPER CONVEYANCE DIRECTION)

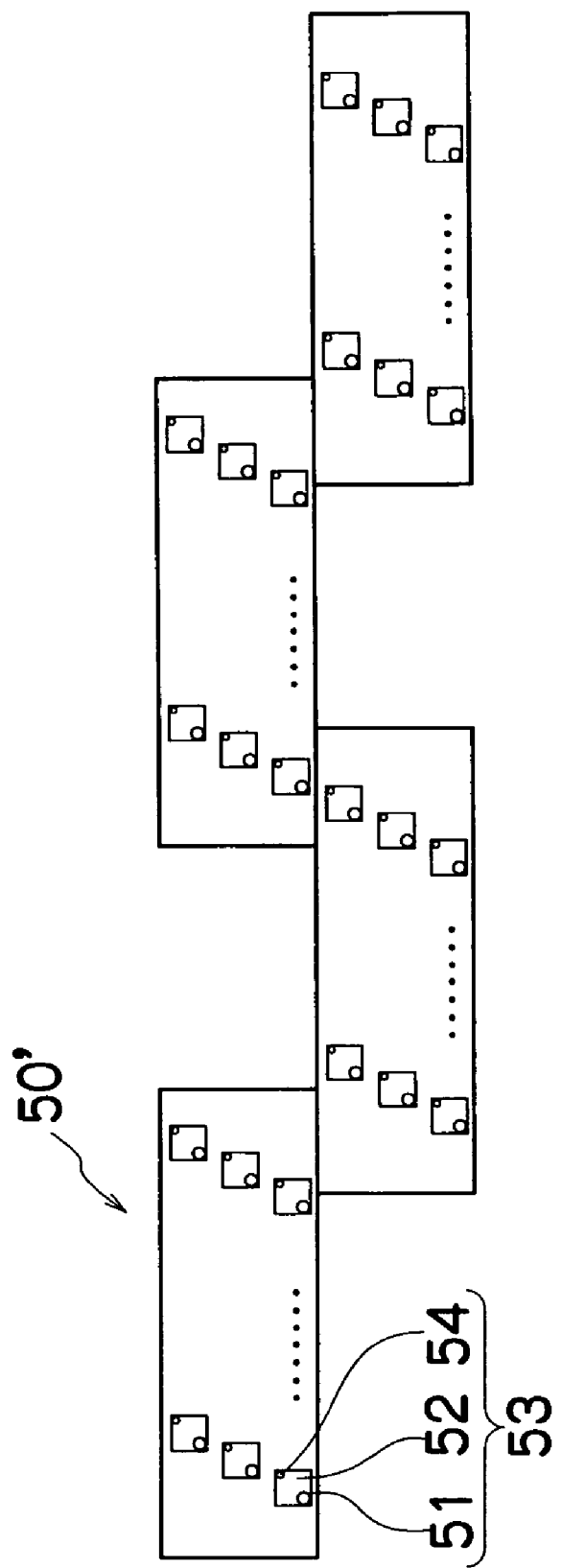

IMAGE FORMING APPARATUS AND DROPLET EJECTION CONTROL METHOD

BACKGROUND OF THE INVENTION

1. Field of the Invention

The present invention relates to an image forming apparatus and a droplet ejection control method, and more particularly to a recording control technology for an image forming apparatus and a droplet ejection control method for forming an image by means of dots formed with organic pigment ink on a recording medium.

2. Description of the Related Art

Recently, inkjet recording apparatuses (inkjet printers) have become common as recording apparatuses for printing and recording images captured by digital still cameras, and the like. An inkjet recording apparatus comprises a plurality of recording elements (nozzles) in a head, the recording head being move to scan a recording medium while droplets of ink are ejected onto the recording medium from the recording elements, the recording medium being conveyed through a distance corresponding to one line, each time one line of an image is recorded onto a recording medium, and an image being formed onto the recording paper by repeating this process.

Inkjet printers include those which use a fixed-length serial head, and carry out recording by moving the head in the lateral direction of a recording medium, and those which use a line head in which recording elements are arranged over a length corresponding to the full dimension of one edge of the recording medium. In a printer using a line head, it is possible to record an image across the entire surface of the recording medium, by scanning the recording medium in an orthogonal direction to the direction in which the recording elements are arranged. In a printer using a line head, it is not necessary to provide a conveyance system, such as a carriage, for moving a short-dimension head, nor is it necessary to move a carriage, or perform complicated scanning control of the recording medium. Furthermore, since only the recording medium is moved, it is possible to increase the recording speed in comparison to printers using serial heads.

In an inkjet printer, one image is represented by combining dots formed by ink ejected from recording elements (nozzles). High image quality can be achieved by making the dots small in size and by using a large number of pixels per image. Small dot size can be achieved by reducing the amount of ink ejected, and therefore it is necessary to control the ink ejection volume finely and accurately. The relative speed of the recording medium and the recording head, and the ink ejection timing, are controlled in such a manner that adjacently positioned dots are deposited at prescribed positions.

Japanese Patent Application Publication No. 3-247450 discloses an inkjet recording apparatus and proposes a technology for calculating printing times for avoiding image distortion, according to the ink absorption characteristics, ink permeability, ink (dot) density, ink volume, ink evaporation characteristics, and ambient temperature. In other words, the drying time of the ink, and the like, is estimated from the aforementioned parameters, and the interval between one recording operation and the next is adjusted accordingly.

Furthermore, Japanese Patent Application Publication No. 10-250059 discloses a method of manufacturing a recording head for an inkjet printer, and a printing method; more specifically, a method of manufacturing a print head in which the distance between nozzles is determined in accordance with the ink drying time, and a print method using this print head.

On the other hand, inks to be used in inkjet printers are roughly classified into dye-based inks and pigment-based inks. As the coloring material for ink-jet ink, dyes have been used, but they have drawbacks as to water resistance and light resistance. To overcome the drawbacks, pigments have come to be used. Images obtained from pigment inks have remarkable advantages of superior light resistance and water resistance compared with images obtained from dye-based inks. However, there are problems that the pigment is not easily formed uniformly or pulverized into fine-particles of a nanometer size (i.e., monodispersion), which can permeate pores in the surface of paper, and it is then difficult to form images with high saturation because the pigment is poor in permeability into the paper.

As measures to solve the above-described problems, Japanese Patent Application Publication No. 2002-146222 discloses a method to produce fine particles of pigment using a microjet reactor method. This is a method of introducing a solution, in which a pigment is dissolved, and a precipitation medium solution, into two nozzles that are opposite to each other and that have different micrometer sizes, at high pressure (for example, 5 MPa) by means of pumps; and introducing a gas (such as compressed air) perpendicularly into a portion where the jet flows of the two solutions collide with each other, so as to discharge a suspension of the pigment by the gas flow (flow rate, about 0.5 m$^3$/h).

In the image formation by means of the inkjet recording apparatus, there are problems that if a plurality of dots are ejected so as to land in an overlapping manner on a recording medium, the ink droplets combine, the original circular shapes of the dots are lost (i.e., occurrence of deposition interference), and hence it becomes difficult to form the desired image with high resolution.

However, it is difficult to solve the problems concerning the deposition interference with the measures disclosed in Japanese Patent Application Publication Nos. 3-247450 and 2002-146222. In particular, when the pigment ink containing the pigment particles of large particle size and poor monodispersion is used, it is difficult to form images with high saturation, and moreover, the deposition interference may be aggravated.

In the inkjet recording apparatus disclosed in Japanese Patent Application Publication No. 3-247450, the time for avoiding image distortion is determined for each parameter, but it is extremely difficult to determine a time for avoiding image distortion in relation to various types of dot patterns. Furthermore, no sufficient explanation of the recording method is given in cases where mixed patterns combining different dot pitches and dot sizes are formed in one image.

In the method for manufacturing a recording head for an inkjet printer and the printing method disclosed in Japanese Patent Application Publication No. 10-250059, it is stated that a second dot is ejected so as to land after the drying time for a first dot has elapsed. However, since an adjacent dot cannot be deposited onto the paper until the existing dot on the surface of the paper has dried completely, then printing takes an extremely long time. Furthermore, since the distance between the nozzles is determined by estimating the drying time based on one set of conditions, and since this is a fixed value, it is not possible to respond to cases where different ink or paper is used.

In the method for producing fine particles of pigment disclosed in Japanese Patent Application Publication No. 2002-146222, particles are generated in a very small space, of a micrometer scale, and the particles are immediately taken out from the apparatus, thereby preventing the apparatus from being blocked by the pigment fine-particles. This method is then preferred to obtain fine particles having a narrow particle size distribution. However, the method has such problems as that the contact time for the two solutions is not easily controlled, and thus subtle reaction control is difficult. Therefore, it is difficult to stably produce fine particles of pigment of sufficient monodispersion.

In the related art as described above, there are unsolved problems of prevention of the deposition interference and production of fine particles of pigment, and it is hence difficult to obtain images of high resolution and high saturation by means of the pigment ink.

SUMMARY OF THE INVENTION

The present invention has been contrived in view of such circumstances, and an object thereof is to provide an image forming apparatus and a droplet ejection control method whereby pigment ink containing pigment particles of fine particle size and excellent monodispersion can be ejected from the recording head, and image distortion caused by superimposition of dots is prevented, without increasing the recording time, so that it is possible to obtain images of high resolution and high saturation by means of the pigment ink and also to perform high-speed ejection.

In order to attain the above-described object, the present invention is directed to an image forming apparatus, comprising a recording head which ejects droplets of a liquid onto a recording medium, the liquid containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow.

The inventors, having eagerly investigated to solve the above-mentioned problems in the related art, have found out that, when a solution containing a reaction component is caused to flow into a channel, to synthesize a target organic pigment, the organic pigment, of high purity, can be rapidly obtained under a mild condition. Further, the inventors have found out that, by carrying out a co-precipitation method (re-precipitation method) to a solution of an organic pigment, under the effect of pH change, in a channel in which a laminar flow is preferential (predominant), organic pigment fine-particles having evener particle sizes can be obtained, compared with when a method in the related art, as performed in a flask, is carried out.

According to the present invention, the pigment ink containing the organic pigment fine particles having excellent monodispersion is ejected from the recording head, so that the permeability of the coloring material into the paper is improved, the deposition interference is prevented, and images of high resolution and high saturation are hence obtainable. Moreover, the block of the nozzles in the recording head is prevented significantly in comparison with the pigment ink in the related art.

In particular, when the pigment ink containing the organic pigment fine particles having excellent monodispersion is used in the image forming apparatus utilizing aggregation reaction in two types of liquid, in which the ink containing the pigment-based coloring material and a treatment liquid making the pigment particles to aggregate are deposited and/or applied, then the pigment particles are instantaneously made to aggregate and deposited on the recording medium, and the shapes of dots formed by the pigment particles are not deformed even if the solvents in the ink droplets mix and combine together. Thus, the deposition interference is significantly prevented.

In order to attain the aforementioned object, the present invention is also directed to an image forming apparatus, comprising: a recording head which ejects droplets of a liquid onto a recording medium, the liquid containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow; a droplet ejection control device which controls a droplet ejection timing of the recording head; and a conveyance device which relatively moves the recording medium and the recording head in a relative conveyance direction, wherein when the recording head performs ejection of a first droplet to form a first dot on the recording medium and then performs ejection of a second droplet to form a second dot overlapping with the first dot on the recording medium, the droplet ejection control device controls the droplet ejection timing of the recording head by taking a droplet diameter change time until a diameter of the first droplet deposited on a surface of the recording medium reaches $D1b$ satisfying the following inequality as a droplet ejection time interval between the ejection of the first droplet and the ejection of the second droplet: $D1b < 2 \times Pt - D2a$, where $Pt$ is an interval between the first dot and the second dot on the surface of the recording medium, $D2a$ is a diameter of the second droplet upon landing on the surface of the recording medium, and $D1b$ is the diameter of the first droplet on the surface of the recording medium when the second droplet lands on the surface of the recording medium.

According to the present invention, even if a second droplet is ejected so as to land on the recording medium without waiting for the first droplet, which landed previously on the recording medium, to be retained completely in the recording medium, there is still no combining of the ink droplets on the surface of the recording medium. Therefore, blurring caused by mixing of the first droplet and the second droplet can be prevented, and a desired dot shape can be obtained, without reducing the printing speed.

For example, as a droplet proceeds to permeate into the recording medium, the droplet reduces in size at the surface of the recording medium, from the outer side (outer circumference) toward the inner side. The size of the dot formed by the droplet is substantially the same as the size of the droplet when it lands on the recording medium.

The interval between the first dot and the second dot (namely, the dot pitch) $Pt$ is substantially the same as the interval between the droplets when ejected (recorded) normally from the recording head.

Furthermore, if the first droplet has permeated completely, solidified completely, or the like, then $D1b$ will be zero. Therefore, a state where the first ink droplet has not yet permeated completely is indicated by the expression $D1b > 0$.

If the first dot and the second dot are overlapping, then the total of the radius of the first dot ($D1a/2$) and the radius of the second dot ($D2a/2$) is greater than the distance $Pt$ between the first dot and the second dot. This state is indicated by the relationship $Pt < (D1a/2) + (D2a/2)$.

The recording head may be a full line type recording head in which recording elements, such as ink ejecting holes, are arranged over a length corresponding to the full dimension of the printable region of the recording medium, in a direction substantially orthogonal to the relative conveyance direction of the conveyance device. The recording head may also be a serial type (shuttle scan type) recording head in which ink droplets are ejected from a recording head of short dimensions, while the head is moved in a direction substantially orthogonal to the relative conveyance direction of the conveyance device.

Moreover, "recording medium" indicates a medium (an image forming medium) which receives printing by means of a recording head, and more specifically, this term includes various types of media, irrespective of material and size, such as continuous paper, cut paper, sealed paper, resin sheets, such as OHP sheets, film, cloth, and other materials.

In order to achieve relative movement between the recording medium and the recording head, it is possible to move the recording medium with respect to a fixed recording head, or to move the recording head with respect to a fixed recording medium. Alternatively, it is also possible to move both the recording medium and the recording head. A conveyance belt, conveyance drum, or the like, can be used as a conveyance device for the recording medium.

According to the present invention, the pigment ink containing the organic pigment fine particles having excellent monodispersion is ejected from the recording head, and the droplet ejection control is performed to prevent image distortion caused by superimposition of dots, without increasing the recording time, so that it is possible to obtain images of high resolution and high saturation by means of the pigment ink.

Preferably, the image forming apparatus further comprises: a droplet ejection condition calculating device which determines the diameter D1$b$ of the first droplet satisfying the inequality: D1$b$<2×Pt−D2$a$, with respect to the interval Pt between the first dot and the second dot on the surface of the recording medium, and the diameter D2$a$ of the second droplet upon landing on the surface of the recording medium; and a droplet diameter change time calculating device which determines the droplet diameter change time from a time at which the first droplet lands on the surface of the recording medium until the diameter of the first droplet on the surface of the recording medium reaches D1$b$.

According to the present invention, since the image forming apparatus comprises the droplet ejection condition calculating device which determines the condition of the first droplet at which the second droplet can be deposited, and the droplet diameter change time calculating device which determines the time until the first droplet satisfies this condition, then the droplet ejection time interval can be efficiently determined inside the apparatus.

Preferably, when a mixed pattern including a plurality of combinations of the interval between the first dot and the second dot, the first dot diameter and the second dot diameter, is to be formed within one image on the recording medium, the droplet diameter change time calculating device calculates a plurality of values for the droplet diameter change time, and the droplet ejection control device controls a recording timing for the image by using a representative value of the plurality of droplet ejection diameter change time values. According to this, even to images comprising mixed patterns of varying dot intervals (dot pitches), and varying dot sizes are acceptable. Therefore, the droplet ejection timing can be optimized for each image.

Mixed patterns may comprise a plurality of dot intervals, or a plurality of dot sizes, or they may comprise both a plurality of dot intervals and a plurality of dot sizes. Any of these cases is acceptable.

The representative value may be the maximum value, minimum value, average value, the most frequently used value, or the like. The most suitable type of representative value is preferably chosen according to the image quality and recording control conditions. It is possible to use either one representative value per image, or a plurality of representative values per image.

Preferably, the representative value of the droplet diameter change time includes at least a value not less than a maximum value of the plurality of droplet diameter change time values calculated by the droplet diameter change time calculating device. According to this, since the droplet ejection timing within an image is controlled in accordance with the pattern having the longest droplet diameter change time, then blurring of dots can be prevented reliably, while simplifying the related control operation and hence reducing the burden on the control system.

The droplet diameter change time may be the maximum value determined from the respective patterns, or it may be a time incorporating a safety margin in addition to the maximum value. However, the droplet diameter change time is less than the time taken for the droplet to permeate or solidify completely.

Preferably, the image forming apparatus further comprises: an information supply device which supplies information containing at least one of information relating to a type of the liquid and information relating to a type of the recording medium, wherein the droplet diameter change time calculating device calculates the droplet diameter change time according to the information supplied by the information supply device. According to this, even if the type of the liquid or the type of the recording medium (recording paper) is changed, optimal droplet ejection timing is used to perform recording (image formation). Therefore, not only is a fast printing speed achieved, but also, the desired dot shape can be obtained.

In addition to the ink type and the recording medium type, the aforementioned information may also include other factors which affect the permeation rate of the ink, such as the temperature, humidity, or other environmental conditions. Desirably, these conditions are stored as a data table, in such a manner that the data table can be referred to each time the droplet diameter change time is determined.

Preferably, the droplet diameter change time calculating device determines a first droplet diameter change time in a main scanning direction substantially orthogonal to the relative conveyance direction, and a second droplet diameter change time in a sub-scanning direction being the relative conveyance direction, according to the interval between the first dot and the second dot in the main scanning direction, and the interval between the first dot and the second dot in the sub-scanning direction; and the droplet ejection control device controls the droplet ejection timing by taking the first droplet diameter change time and the second droplet diameter change time as a droplet ejection time interval in the main scanning direction and a droplet ejection time interval in the sub-scanning direction, respectively. According to this, the droplet ejection timing can be controlled respectively in the direction substantially orthogonal to the relative conveyance direction of the conveyance device (namely, the main scanning direction), and in the relative conveyance direction of the conveyance device (namely, the sub-scanning direction).

Preferably, the droplet ejection control device controls the droplet ejection timing by means of one droplet ejection time interval within one image. According to this, since droplet ejection control is carried out using one droplet ejection interval within one image, then one droplet ejection interval can be determined for each image.

For example, the recording head is a line head in which a plurality of nozzles are arranged over a length corresponding to a full width of the recording medium. The line head may be a divided head which is divided into a plurality of heads in the longitudinal direction of the head. Furthermore, the head may be provided with one row of nozzles, or a plurality of rows of nozzles. Preferably in this case, the recording head comprises a first nozzle row having nozzles for ejecting droplets forming odd-numbered dots of dots formed in a direction substantially orthogonal to the relative conveyance direction, and a second nozzle row having nozzles for ejecting droplets forming even-numbered dots of the dots; and the image forming apparatus further comprises an interval changing device which changes an interval between the first nozzle row and the second nozzle row according to the droplet ejection control in the relative conveyance direction. According to this, the recording timing in the direction substantially orthogonal to the recording medium can be controlled efficiently in the line head.

Alternatively, it is possible that the recording head is a serial head in which a plurality of nozzles are arranged over a length shorter than a full width of the recording medium, and the recording head comprises a moving device which relatively moves the recording head and the recording medium in a direction in which the plurality of nozzles are arranged. Preferably in this case, the recording head comprises a first nozzle row having nozzles for ejecting droplets forming odd-numbered dots of dots formed in a direction substantially orthogonal to the relative conveyance direction, and a second nozzle row having nozzles for ejecting droplets forming even-numbered dots of the dots; and the image forming apparatus further comprises an interval changing device which changes an interval between the first nozzle row and the second nozzle row according to the droplet ejection control in the direction substantially orthogonal to the relative conveyance direction. According to this, it is possible to control the recording timing in the direction substantially orthogonal to the recording medium, without altering the conveyance speed or the recording frequency.

Preferably, the solution of the organic pigment contains at least one dispersing agent. According to this, it is possible to obtain the organic pigment fine particles of a nanometer size and excellent monodispersion, so that the saturation of the image formed by the pigment ink, the permeability of the pigment into the paper, and the prevention of the deposition interference are further improved.

Preferably, the fine particles of the organic pigment have a mode diameter of 1 μm or less. This means that the distribution range of the organic pigment fine particles is narrow in terms of their chemical composition and crystal structure. Thus, the organic pigment fine particles are uniform in terms of their property, so that it is possible to obtain images of high resolution and high saturation by means of the pigment ink more reliably.

Preferably, the solution of the organic pigment is alkaline; and the organic pigment is a quinacridone-series pigment represented by the following Formula (I):

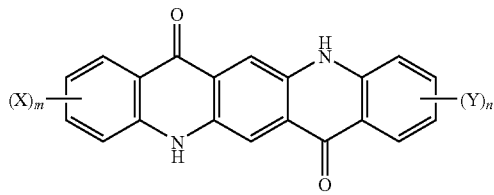

Formula (I)

where X and Y each independently represent a fluorine atom, a chlorine atom, an alkyl group having 1 to 3 carbon atoms, an alkoxy group having 1 to 3 carbon atoms, or a $COOR_a$ group in which $R_a$ represents a hydrogen atom, or an alkyl group having 1 to 10 carbon atoms; and m and n each independently are 0, 1 or 2.

The quinacridone-series pigment is relatively preferable among various pigments to be used in pigment-based ink, and hence the fine particles are preferably made of the quinacridone-series pigment.

Preferably, the liquid ejected from the recording head is alkaline; and at least a part of the recording head to be in contact with the liquid is made of an alkaline-resistant material. According to this, alkaline dispersion containing alkaline pigment such as the quinacridone-series pigment can be conveniently used in the recording head without further countermeasures.

In order to attain the aforementioned object, the present invention is also directed to a droplet ejection control method for an image forming apparatus comprising: a recording head which ejects droplets of a liquid onto a recording medium, the liquid containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow; and a droplet ejection control device which controls a droplet ejection timing of the recording head, the method comprising: a first droplet ejecting step of ejecting a first droplet to form a first dot on the recording medium; a second droplet ejecting step of ejecting a second droplet to form a second dot overlapping with the first dot on the recording medium, after the first droplet ejecting step; a droplet ejection condition calculating step of determining a diameter of the first droplet deposited on a surface of the recording medium so that the first droplet and the second droplet do not overlap on the surface of the recording medium, when the second droplet is ejected; and a droplet diameter change time calculating step of determining a time required for the diameter of the first droplet deposited on the surface of the recording medium to change from its value upon landing on the surface of the recording medium, to a value at which the first droplet does not overlap with the second droplet on the surface of the recording medium.

Software (a program) for achieving the aforementioned steps may be created, and this program may be implemented by means of a control device, such as a CPU (central processing unit). Furthermore, the program may also be stored on a recording medium, or distributed through a network.

According to the present invention, the pigment ink containing the pigment particles of fine particle size and excellent monodispersion can be ejected from the recording head, the droplet ejection control is performed to prevent image distortion caused by superimposition of dots, without increasing the recording time, so that it is possible to obtain images of high resolution and high saturation by means of the pigment ink, and also to perform high-speed ejection.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3C is a perspective plan view showing another example of the configuration of the print head;

DETAILED DESCRIPTION OF THE PREFERRED EMBODIMENTS

Among pigment ink and inkjet recording apparatus according to embodiments of the present invention, the inkjet recording apparatus is hereinafter described.

General Configuration of an Inkjet Recording Apparatus

Figure 1:
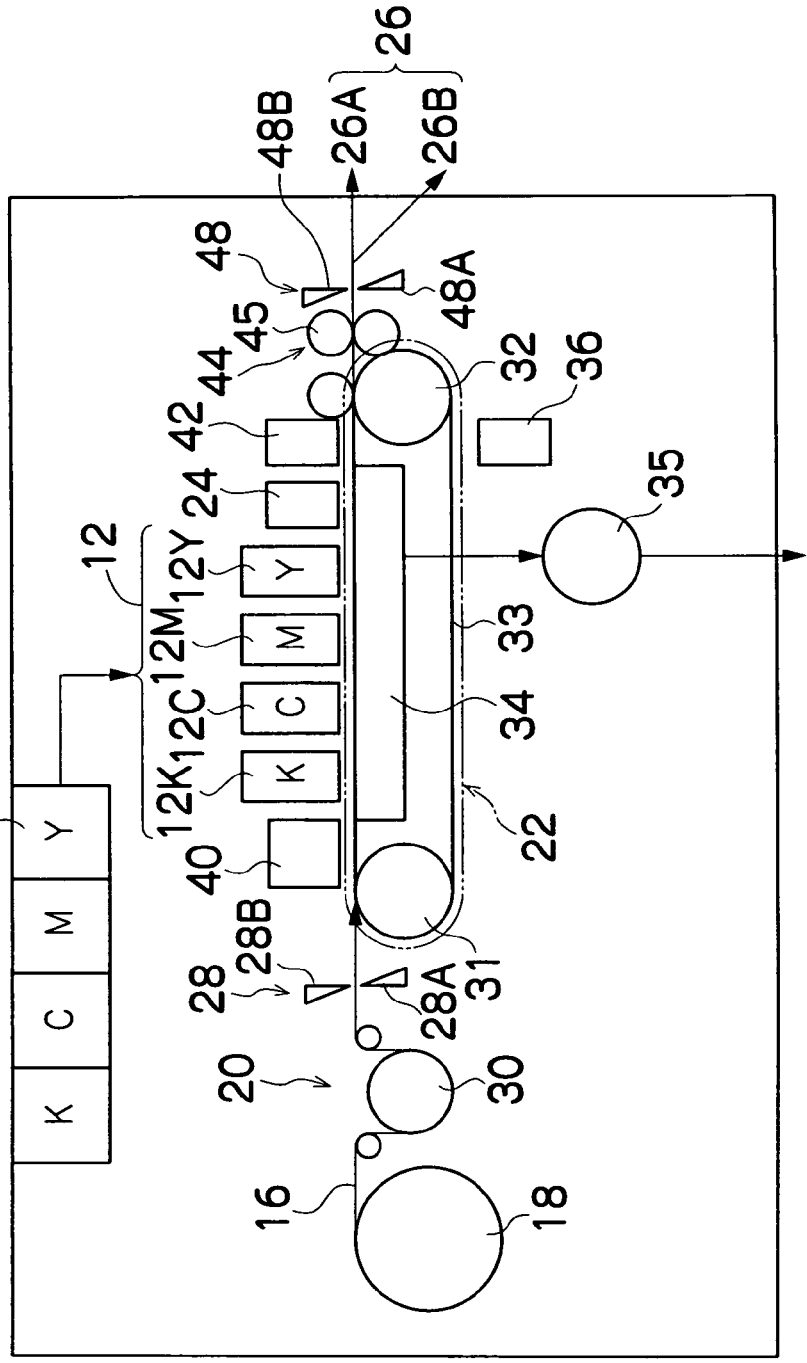
FIG. 1 is a general schematic drawing of an inkjet recording apparatus according to an embodiment of the present invention.

FIG. 1 is a general schematic drawing of an inkjet recording apparatus according to an embodiment of the present invention. As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing/loading unit 14 for storing inks to be supplied to the print heads 12K, 12C, 12M, and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a single magazine for rolled paper (continuous paper) is shown as an example of the paper supply unit 18; however, a plurality of magazines with paper differences such as paper width and quality may be jointly provided. Moreover, paper may be supplied with a cassette that contains cut paper loaded in layers and that is used jointly or in lieu of a magazine for rolled paper.

In the case of a configuration in which a plurality of types of recording paper can be used, it is preferable that a information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is equal to or greater than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and the suction chamber 34 provides suction with a fan 35 to generate a negative pressure, and the recording paper 16 is held on the belt 33 by suction. The belt 33 is driven in the clockwise direction in FIG. 1 by the motive force of a motor (not shown in FIG. 1, but shown as a motor 88 in FIG. 6) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not depicted, examples thereof include a configuration in which the belt 33 is nipped with a cleaning roller such as a brush roller and a water absorbent roller, an air blow configuration in which clean air is blown onto the belt 33, or a combination of these. In the case of the configuration in which the belt 33 is nipped with the cleaning roller, it is preferable to make the line velocity of the cleaning roller different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
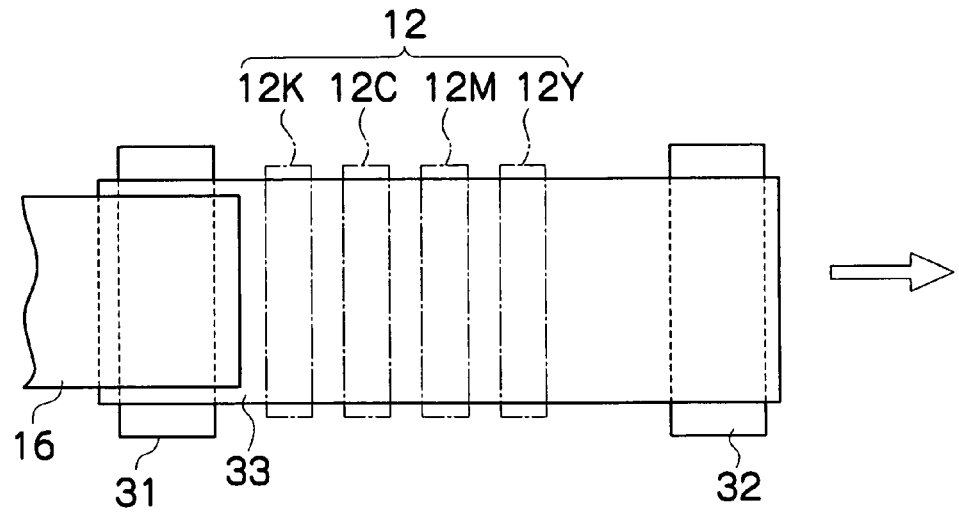
FIG. 2 is a plan view of principal components of an area around a printing unit of the inkjet recording apparatus in FIG. 1.

As shown in FIG. 2, the printing unit 12 forms a so-called full-line head in which a line head having a length that corresponds to the maximum paper width is disposed in the main scanning direction perpendicular to the delivering direction of the recording paper 16 (hereinafter referred to as the paper conveyance direction) represented by the arrow in FIG. 2, which is substantially perpendicular to a width direction of the recording paper 16. A specific structural example is described later with reference to FIGS. 3A to 5. Each of the print heads 12K, 12C, 12M, and 12Y is composed of a line head, in which a plurality of ink-droplet ejection apertures (nozzles) are arranged along a length that exceeds at least one side of the maximum-size recording paper 16 intended for use in the inkjet recording apparatus 10, as shown in FIG. 2.

The print heads 12K, 12C, 12M, and 12Y are arranged in this order from the upstream side along the paper conveyance direction. A color print can be formed on the recording paper 16 by ejecting the inks from the print heads 12K, 12C, 12M, and 12Y, respectively, onto the recording paper 16 while conveying the recording paper 16.

Although the configuration with the KCMY four standard colors is described in the present embodiment, combinations of the ink colors and the number of colors are not limited to those, and light and/or dark inks can be added as required. For example, a configuration is possible in which print heads for ejecting light-colored inks such as light cyan and light magenta are added. Moreover, a configuration is possible in which a single print head adapted to record an image in the colors of CMY or KCMY is used instead of the plurality of print heads for the respective colors.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

As shown in FIG. 1, the ink storing/loading unit 14 has tanks for storing the inks to be supplied to the print heads 12K, 12C, 12M, and 12Y, and the tanks are connected to the print heads 12K, 12C, 12M, and 12Y through channels (not shown), respectively. The ink storing/loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the print unit 12, and functions as a device to check for ejection defects such as clogs of the nozzles in the print unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern printed with the print heads 12K, 12C, 12M, and 12Y for the respective colors, and the ejection of each head is determined. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathway in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, a sorter for collecting prints according to print orders is provided to the paper output unit 26A for the target prints.

Next, the structure of the print heads is described. The print heads 12K, 12C, 12M, and 12Y provided for the ink colors have the same structure, and a reference numeral 50 is hereinafter designated to any of the print heads 12K, 12C, 12M, and 12Y FIG. 3A is a perspective plan view showing an example of the configuration of the print head 50, FIG. 3B is an enlarged view of a portion thereof, FIG. 3C is a perspective plan view showing another example of the configuration of the print head, and FIG. 4 is a cross-sectional view taken along the line 4-4 in FIG. 3B, showing the inner structure of an ink chamber unit.

The print head 50 of the present embodiment includes print heads 50A and 50B, which are movable relatively to each other along the paper conveyance direction so as to change the distance between the print heads 50A and 50B (i.e., the nozzle pitch along the paper conveyance direction).

For example, a configuration is possible where the print head 50A is provided with a head moving mechanism (not shown) including a carriage mechanism such as a motor, a ball screw, a slide rail, and a guide member, and the print head 50A is movable relatively to the stationary print head 50B. Another configuration is also possible where both the print heads 50A and 50B are provided with the above-described head moving mechanisms and are movable. It is also possible that the print head 50A is fixed and the print head 50B is movable.

Figure 3A:
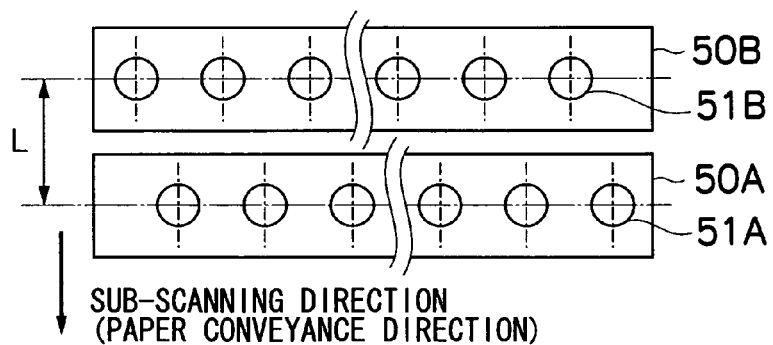
FIG. 3A is a perspective plan view showing an example of a configuration of a print head.
Figure 3B:
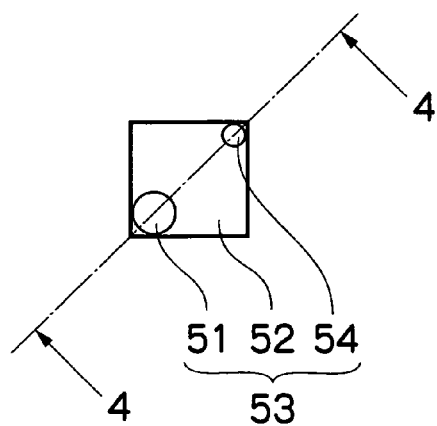
FIG. 3B is a partial enlarged view of FIG. 3A.
Figure 4:
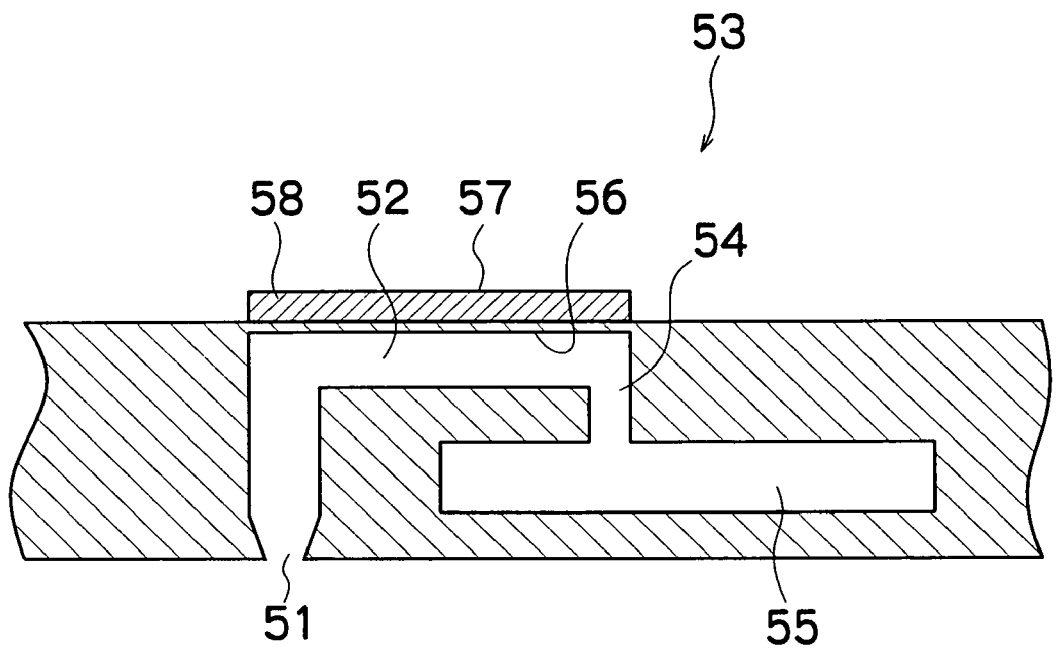
FIG. 4 is a cross-sectional view along the line 4-4 in FIG. 3B.

As shown in FIG. 3A, each of the print heads 50A and 50B has a single row of a plurality of nozzles in the direction substantially perpendicular to the paper conveyance direction. The interval (nozzle pitch) of nozzles 51A arranged in the print head 50A is equal to the nozzle pitch of nozzles 51B arranged in the print head 50B.

The print heads 50A and 50B are positioned relatively to each other in the direction substantially perpendicular to the paper conveyance direction so that the nozzle 51B of the print head 50B is positioned at a substantially halfway point between the adjacent nozzles 51A of the print head 50A.

In other words, the nozzles 51A of the print head 50A and the nozzles 51B of the print head 50B are arranged with deviation of a half pitch from each other in the form of a staggered matrix. This is equivalent to the arrangement where nozzles are arranged with a half pitch of the nozzles in the print head 50 along a line in the direction substantially perpendicular to the paper conveyance direction.

Each of the print heads 50A and 50B has the single row of nozzles in the above-described embodiment; however, each of the print heads may have nozzles arranged two-dimensionally in a matrix.

Alternatively, as shown in FIG. 3C, it is possible to arrange and combine a plurality of short-length head units 50', each of which has nozzles two-dimensionally arranged, in the form of a staggered matrix so as to form nozzle rows having lengths that correspond to the entire width of the recording medium.

The planar shape of the pressure chamber 52 provided for each nozzle 51 is substantially a square, and the nozzle 51 and an inlet of supplied ink (supply port) 54 are disposed in both corners on a diagonal line of the square. As shown in FIG. 4, each pressure chamber 52 is connected to a common channel 55 through the supply port 54. The common channel 55 is connected to an ink supply tank, which is a base tank that supplies ink, and the ink supplied from the ink tank is delivered through the common flow channel 55 to the pressure chamber 52. It is preferable to provide a sub-tank (not shown) between the ink tank and the common flow channel 55 nearby the print head 12 or integrally to the print head 12. The sub-tank has a damper function for preventing variation in the internal pressure of the head and a function for improving refilling of the print head.

An actuator 58 having a discrete electrode 57 is joined to a pressure plate 56, which forms the ceiling of the pressure chamber 52, and the actuator 58 is deformed by applying drive voltage to the discrete electrode 57 to eject ink from the nozzle 51. When ink is ejected, new ink is delivered from the common flow channel 55 through the supply port 54 to the pressure chamber 52.

In a full-line head comprising rows of nozzles that have a length corresponding to the maximum recordable width, the "main scanning" is defined as to print one line (a line formed of a row of dots, or a line formed of a plurality of rows of dots) in the width direction of the recording paper (the direction perpendicular to the delivering direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other.

In particular, when the nozzles 51 arranged in a matrix such as that shown in FIG. 3A are driven, the main scanning according to the above-described (3) is preferred. More specifically, one line is printed in the width direction of the recording paper 16 by driving the nozzles 51A and 51B at different timing such as by sequentially driving the nozzles 51A, 51B, 51A, . . . in accordance with the conveyance velocity of the recording paper 16.

On the other hand, the "sub-scanning" is defined as to repeatedly perform printing of one line (a line formed of a row of dots, or a line formed of a plurality of rows of dots) formed by the main scanning, while moving the full-line head and the recording paper relatively to each other.

In the implementation of the present invention, the structure of the nozzle arrangement is not particularly limited to the examples shown in the drawings. Moreover, the present embodiment adopts the structure that ejects ink-droplets by deforming the actuator 58 such as a piezoelectric element; however, the implementation of the present invention is not particularly limited to this, and other actuators can be used.

Figure 5:
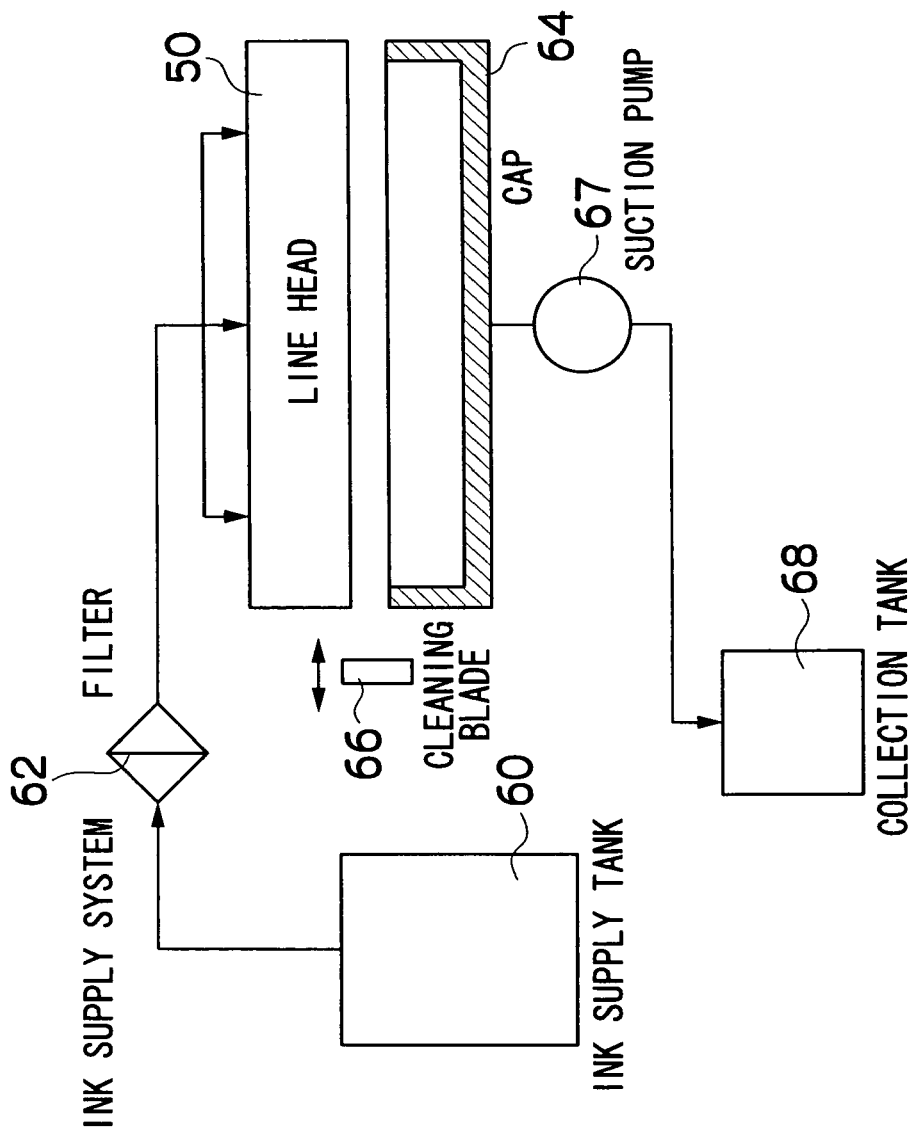
FIG. 5 is a schematic drawing showing a configuration of an ink supply system in the inkjet recording apparatus.

FIG. 5 is a schematic drawing showing the configuration of the ink supply system in the inkjet recording apparatus 10.

An ink supply tank 60 is a base tank that supplies ink and is set in the ink storing/loading unit 14 described with reference to FIG. 1. The aspects of the ink supply tank 60 include a refillable type and a cartridge type: when the remaining amount of ink is low, the ink supply tank 60 of the refillable type is filled with ink through a filling port (not shown) and the ink supply tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink supply tank 60 in FIG. 5 is equivalent to the ink storing/loading unit 14 in FIG. 1 described above.

A filter 62 for removing foreign matters and bubbles is disposed between the ink supply tank 60 and the print head 50, as shown in FIG. 5. The filter mesh size in the filter 62 is preferably equivalent to or less than the diameter of the nozzle and commonly about 20 μm.

Although not shown in FIG. 5, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzle 51 from drying out or to prevent an increase in the ink viscosity in the vicinity of the nozzles, and a cleaning blade 66 as a device to clean the nozzle face. A maintenance unit including the cap 64 and the cleaning blade 66 can be moved in a relative fashion with respect to the print head 50 by a movement mechanism (not shown), and is moved from a predetermined holding position to a maintenance position below the print head 50 as required.

The cap 64 is displaced up and down in a relative fashion with respect to the print head 50 by an elevator mechanism (not shown). When the power of the inkjet recording apparatus 10 is switched OFF or when in a print standby state, the cap 64 is raised to a predetermined elevated position so as to come into close contact with the print head 50, and the ink discharge face of the nozzle 51 is thereby covered with the cap 64.

During printing or standby, when the frequency of use of specific nozzles 51 is reduced and a state in which ink is not discharged continues for a certain amount of time or longer, the ink solvent in the vicinity of the nozzle evaporates and ink viscosity increases. In such a state, ink can no longer be discharged from the nozzle 51 even if the actuator 58 is operated.

Before reaching such a state the actuator 58 is operated (in a viscosity range that allows discharge by the operation of the actuator 58), and a preliminary discharge (purge, air discharge, liquid discharge, dummy discharge) is made toward the cap 64 (ink receptor) to which the degraded ink (ink whose viscosity has increased in the vicinity of the nozzle) is to be discharged.

Also, when bubbles have become intermixed in the ink inside the print head 50 (inside the pressure chamber 52), ink can no longer be discharged from the nozzle even if the actuator 58 is operated. The cap 64 is placed on the print head 50 in such a case, ink (ink in which bubbles have become intermixed) inside the pressure chamber 52 is removed by suction with a suction pump 67, and the suction-removed ink is sent to a collection tank 68.

This suction action entails the suctioning of degraded ink whose viscosity has increased (hardened) when initially loaded into the head, or when service has started after a long period of being stopped. The suction action is performed with respect to all the ink in the pressure chamber 52, so the amount of ink consumption is considerable. Therefore, a preferred aspect is one in which a preliminary discharge is performed when the increase in the viscosity of the ink is small.

The cleaning blade 66 is composed of rubber or another elastic member, and can slide on the ink discharge surface (surface of the nozzle plate) of the print head 50 by means of a blade movement mechanism (wiper, not shown). When ink droplets or foreign matter has adhered to the nozzle plate, the surface of the nozzle plate is wiped, and the surface of the nozzle plate is cleaned by sliding the cleaning blade 66 on the nozzle plate. When the unwanted matter on the ink discharge surface is cleaned by the blade mechanism, a preliminary discharge is carried out in order to prevent the foreign matter from becoming mixed inside the nozzles 51 by the blade.

Figure 6:
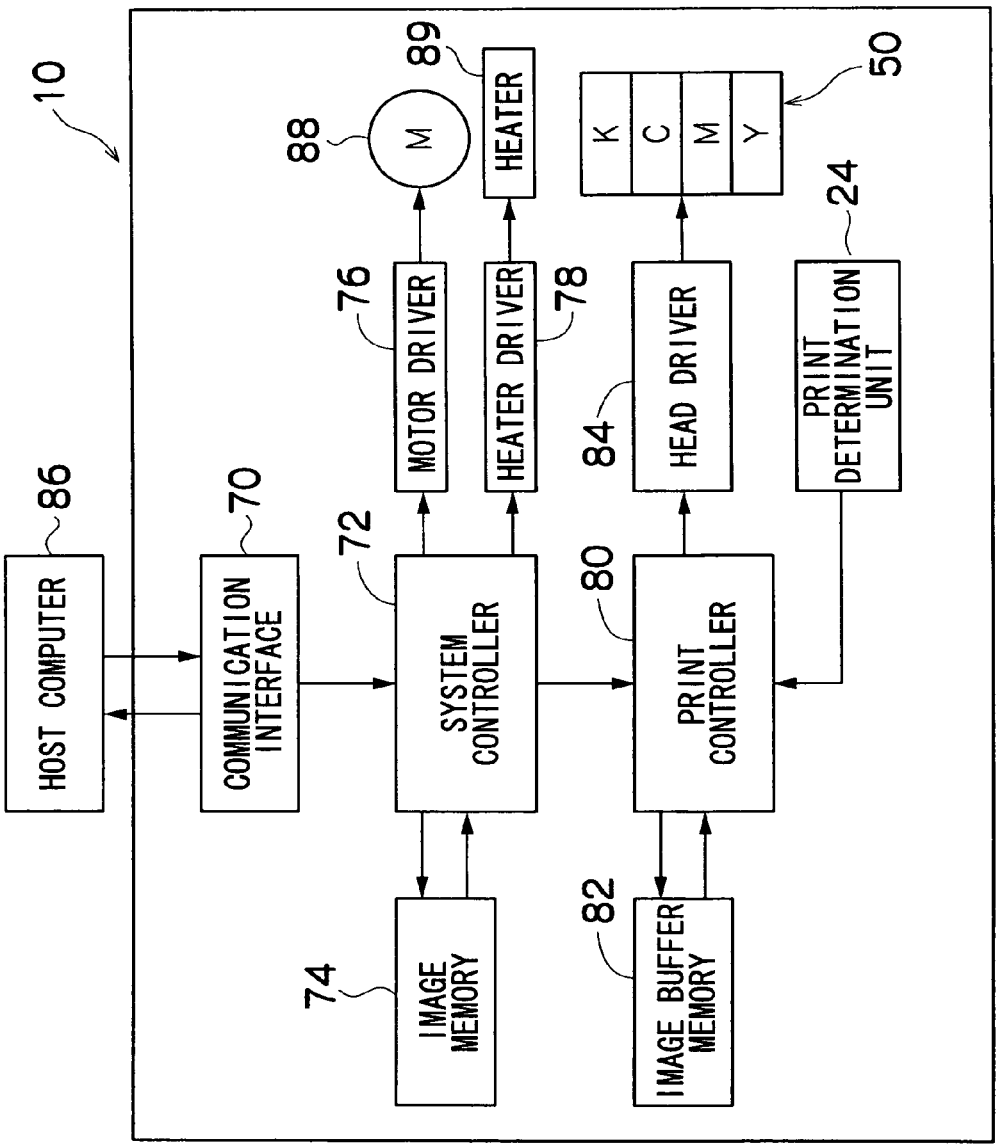
FIG. 6 is a block diagram of principal components showing a system configuration of the inkjet recording apparatus.

FIG. 6 is a block diagram of the principal components showing the system configuration of the inkjet recording apparatus 10. The inkjet recording apparatus 10 has a communication interface 70, a system controller 72, an image memory 74, a motor driver 76, a heater driver 78, a print controller 80, an image buffer memory 82, a head driver 84, and other components.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to memory composed of a semiconductor element, and a hard disk drive or another magnetic medium may be used.

The system controller 72 controls the communication interface 70, image memory 74, motor driver 76, heater driver 78, and other components. The system controller 72 has a central processing unit (CPU), peripheral circuits therefor, and the like. The system controller 72 controls communication between itself and the host computer 86, controls reading and writing from and to the image memory 74, and performs other functions, and also generates control signals for controlling a heater 89 and the motor 88 in the conveyance system.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to apply the generated print control signals (print data) to the head driver 84. Required signal processing is performed in the print controller 80, and the ejection timing and ejection amount of the ink-droplets from the print head 50 are controlled by the head driver 84 according to the image data. Desired dot sizes and dot placement can be brought about thereby.

The print controller 80 is provided with the image buffer memory 82; and image data, parameters, and other data are temporarily stored in the image buffer memory 82 when image data is processed in the print controller 80. The aspect shown in FIG. 6 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives actuators for the print heads 12K, 12C, 12M, and 12Y of the respective colors according to the print data received from the print controller 80. A feedback control system for keeping the drive conditions for the print heads constant may be included in the head driver 84.

Naturally, the members of the inkjet recording apparatus 10 in contact with the ink are made of materials resistant to alkaline ink. Resin materials suitable for the ink supply tank 60, the print heads 50, and the like include polystyrene, polyethylene, polypropylene, and ABS resin. The ink contacting parts in the pressure chambers 52 and the like are preferably coated with polytetrafluoroethylene, or made of metal including SUS304, SUS316, and SUS316L. Rubber materials suitable for the tubes in the ink supply system include vinylmethyl silicone rubber, fluorosilicone rubber, and ethylenepropylene rubber.

Control of Droplet Ejection Timing

The control of droplet ejection timing (droplet ejection control) in the inkjet recording apparatus 10 is now described with reference to FIGS. 7 to 12. In the inkjet recording apparatus 10, in cases where dots formed onto the recording paper 16 are mutually overlapping, the droplet ejection (recording) timing is controlled in such a manner that a succeeding ink droplet 110 (see FIG. 9) is ejected, before a previously ejected (or "preceding") ink droplet 100 has permeated completely into the recording paper 16.

Figure 7:
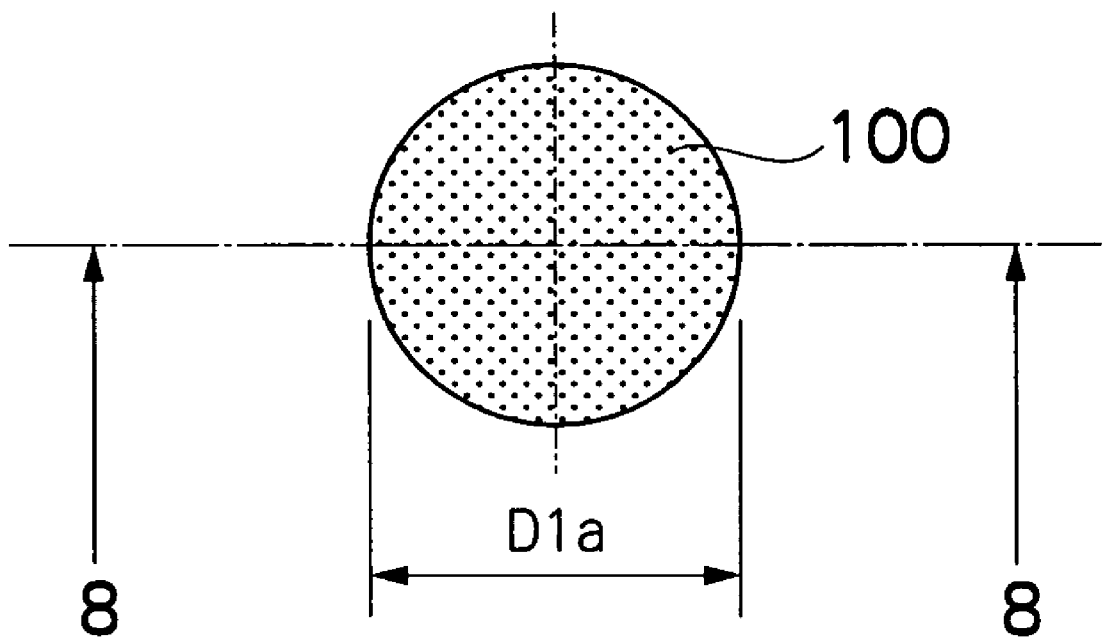
FIG. 7 is a diagram describing droplet ejection control in an inkjet recording apparatus relating to an embodiment of the present invention.

FIG. 7 shows the preceding ink droplet 100, which is ejected first. The diameter of the ink droplet 100 on the surface of the recording paper 16 is D1a.

If the ink is deposited on the recording paper 16 (recording medium) to which ink is permeable, when the ink droplet 100 lands on the surface of the recording paper 16, it permeates into the image receiving layer (not illustrated) of the recording paper 16 as time passes. This permeation is completed from the outer side toward the inner side of the ink droplet 100, and hence the diameter of the ink droplet gradually decreases toward the center.

When a prescribed time period T has passed, the solvent on the surface of the recording paper 16 has disappeared and the ink droplet 100 has permeated completed into the recording paper 16. Here, a dot of a prescribed size is formed. In the present embodiment, the dot is taken to have the same diameter as the diameter of the ink droplet when it lands on the paper. This time period T is taken to be the complete permeation time.

Figure 8:
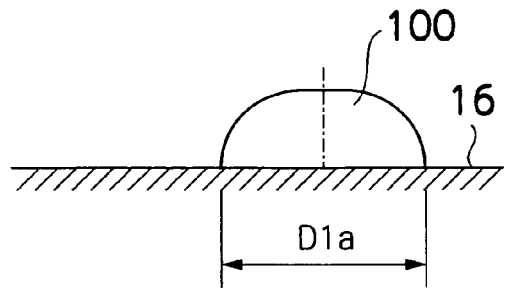
FIG. 8 is a cross-sectional view along the line 8-8 in FIG. 7.

FIG. 8 is a cross-sectional diagram along line 8-8 in FIG. 7, and shows a state immediately after the ink droplet 100 has landed on the recording paper 16.

Figure 9:
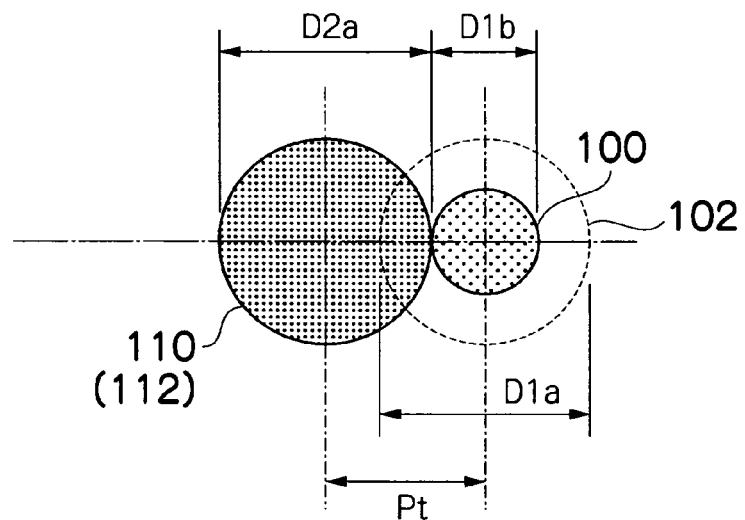
FIG. 9 is a diagram for describing the principal part of the droplet ejection control illustrated in FIG. 7.

FIG. 9 shows a state where a prescribed time period, which is less than the complete permeation time T, has elapsed since the ink droplet 100 landed on the recording paper 16. In this state, the diameter of the ink droplet 100 on the surface of the recording paper 16 has become D1b.

The circle indicated by the dashed line in FIG. 9 shows the dot 102 that is formed by the ink droplet 100, and the size of the dot 102 is approximately the same as that of the ink droplet 100 upon landing on the recording paper 16. More specifically, the dot 102 having the diameter of D1a is formed by the ink droplet 100.

Furthermore, FIG. 9 shows a state where an ink droplet 110 of diameter D2a has been deposited to form a dot 112 having a dot diameter of D2a, at an interval (dot pitch) of Pt from the dot 102.

If the following condition (Formula 1) is satisfied by the relationship between the diameter D1b of the preceding ink droplet 100 when a time δT has elapsed since it landed on the recording paper 16, the diameter D2a of the ink droplet 110 upon landing on the recording paper 16, and the interval Pt between the ink droplet 100 and the ink droplet 110 (which is equivalent to the pitch between the dots formed by the ink droplet 100 and the ink droplet 110):

$$D1b < 2 \times Pt - D2a, \quad (1)$$

then the ink droplet 100 and the ink droplet 110 do not combine on the surface of the recording paper 16. Therefore, the shapes of the dot 102 and the dot 112 formed respectively by the ink droplet 100 and the ink droplet 110 are not disturbed. In FIG. 9, the dot 112 is formed at the same position and to the same size as the ink droplet 110. In this way, the desired dot shape can be achieved.

Here, the condition indicating overlap between the dots 102 and 112 is expressed by $Pt < (D1a/2) + (D2a/2)$. In other words, the condition for overlapping between the dots 102 and 112 is that the total of the radius of the dot 102 plus the radius of the dot 112 be greater than the dot pitch Pt.

The dot 102 shown in FIG. 9 comprises a region where the ink droplet 100 has not permeated into the recording paper 16 (the region illustrated as the ink droplet 100), and a region where the ink droplet 100 has permeated completely into the recording paper 16 and the coloring material (solute) of the ink is held within the image receiving layer of the recording paper 16 (the region of the dot 102 indicated by the dashed line excluding the region indicated by the ink droplet 100). Out of these two regions of the dot 102, it is possible to deposit another ink droplet 110 so as to land on the region where the ink droplet 100 has permeated completely into the recording paper 16.

Figure 10:
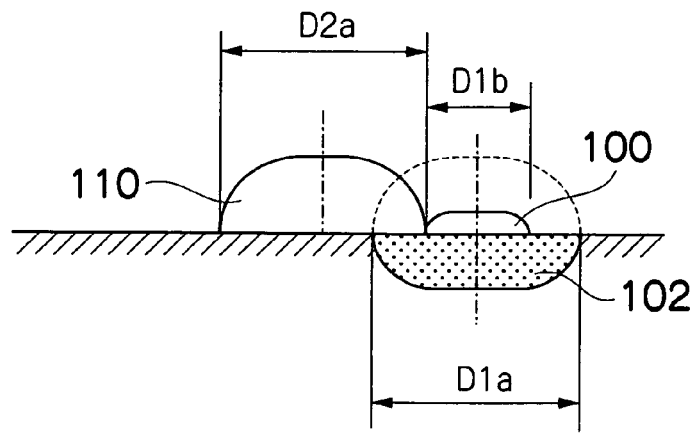
FIG. 10 is a cross-sectional view of FIG. 9.

FIG. 10 is a cross-sectional diagram showing a cross-section of the ink droplet 100 and the ink droplet 110, and corresponds to FIG. 8. As the ink droplet 110 permeates into the recording paper 16, the ink droplet 100 and the ink droplet 110 may combine in the image receiving layer of the recording paper 16 in the region of overlap between the dot 102 and the ink droplet 110. However, even if combining of the droplets occurs in this way, since the ink droplet 100 has already permeated into the image receiving layer and the coloring material (solute) has been retained in this layer, there will be virtually no change in the shape of the dot 102 within the image receiving layer.

Figure 11:
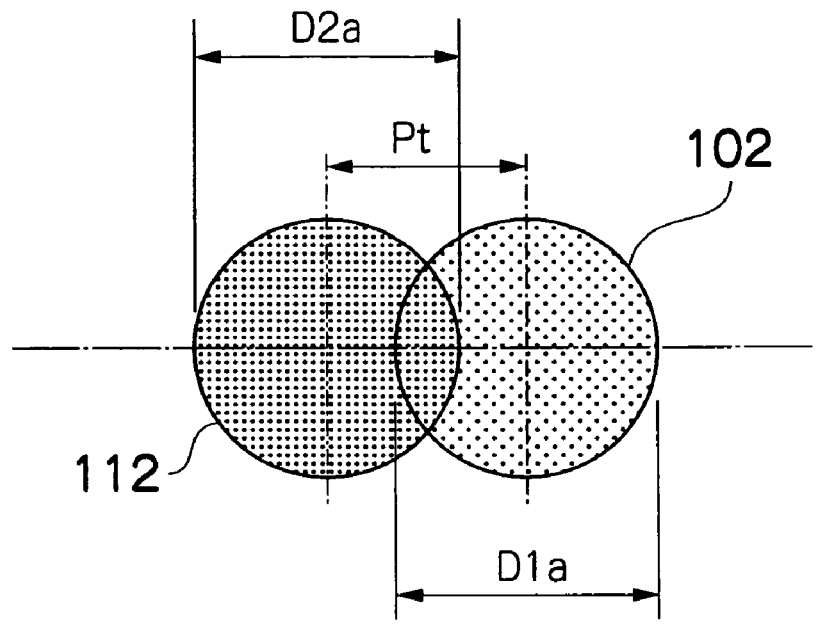
FIG. 11 is a diagram for describing the results of the droplet ejection control illustrated in FIG. 7.

When the aforementioned complete permeation time T has elapsed since the ink droplet 110 landed on the recording paper 16, the ink droplet 110 will have permeated completely into the recording paper 16, and the dot 102 of diameter D1a and the dot 112 of diameter D2a will have been formed, as shown in FIG. 11.

Figure 12:
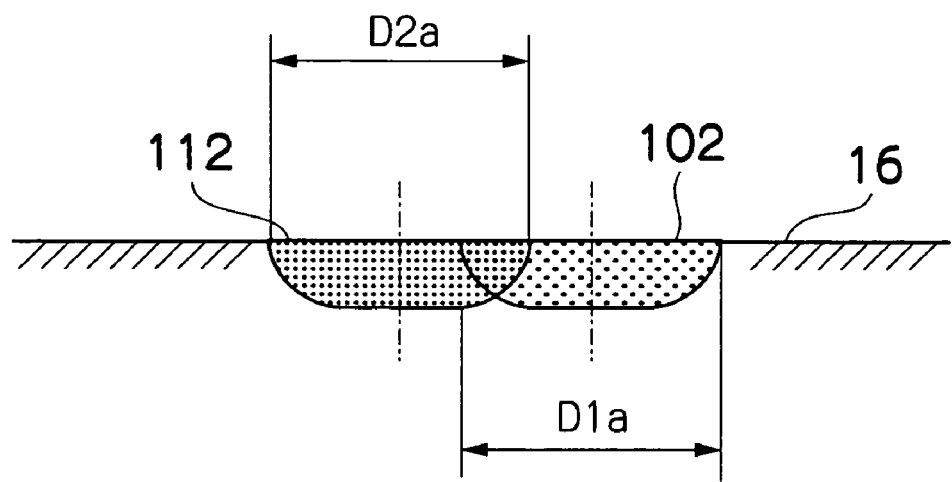
FIG. 12 is a cross-sectional view of FIG. 11.

FIG. 12 is a cross-sectional diagram showing a cross-section of the dot 102 and the dot 112 illustrated in FIG. 11.

Therefore, when two dots are to overlap, after depositing a first ink droplet, it is possible to deposit the succeeding ink droplet without having to wait for the complete permeation time T, which is the time period until the previously deposited ink droplet has permeated completely into the paper. Namely, the succeeding ink droplet can be ejected while D1b is still greater than 0.

In other words, the value of the diameter D1b of the ink droplet 100 that will satisfy the above-described Formula 1 when the ink droplet 110 lands on the paper, is determined from the interval Pt between the preceding ink droplet 100 and the succeeding ink droplet 110 and the diameter D2a of the ink droplet 110 upon landing. The diameter D1b of the ink droplet 100 thus determined, and the diameter D1a of the ink droplet 100 upon landing on the paper, are used to calculate the permeation time δT. The droplet ejection timing for the ink droplet 100 and the ink droplet 110 is controlled by taking the permeation time δT thus determined as the droplet ejection interval.

If the coloring material in the ink has a large molecular structure and is mixed in with a solvent without being dissolved in the solvent, then when an ink droplet lands on the surface of the recording paper 16, the solvent permeates into the image receiving layer and a portion of the coloring material also permeates into the image receiving layer. However, the majority of the coloring material solidifies on the surface of the paper.

In this case, the portion of the ink deposited on the recording paper 16 existing as the droplet becomes small from the outer side towards the inner side as the solidification (curing) advances. Therefore, the present invention can be applied in order to prevent respective ink droplets from mixing together on the surface of the recording paper 16.

Figure 13:
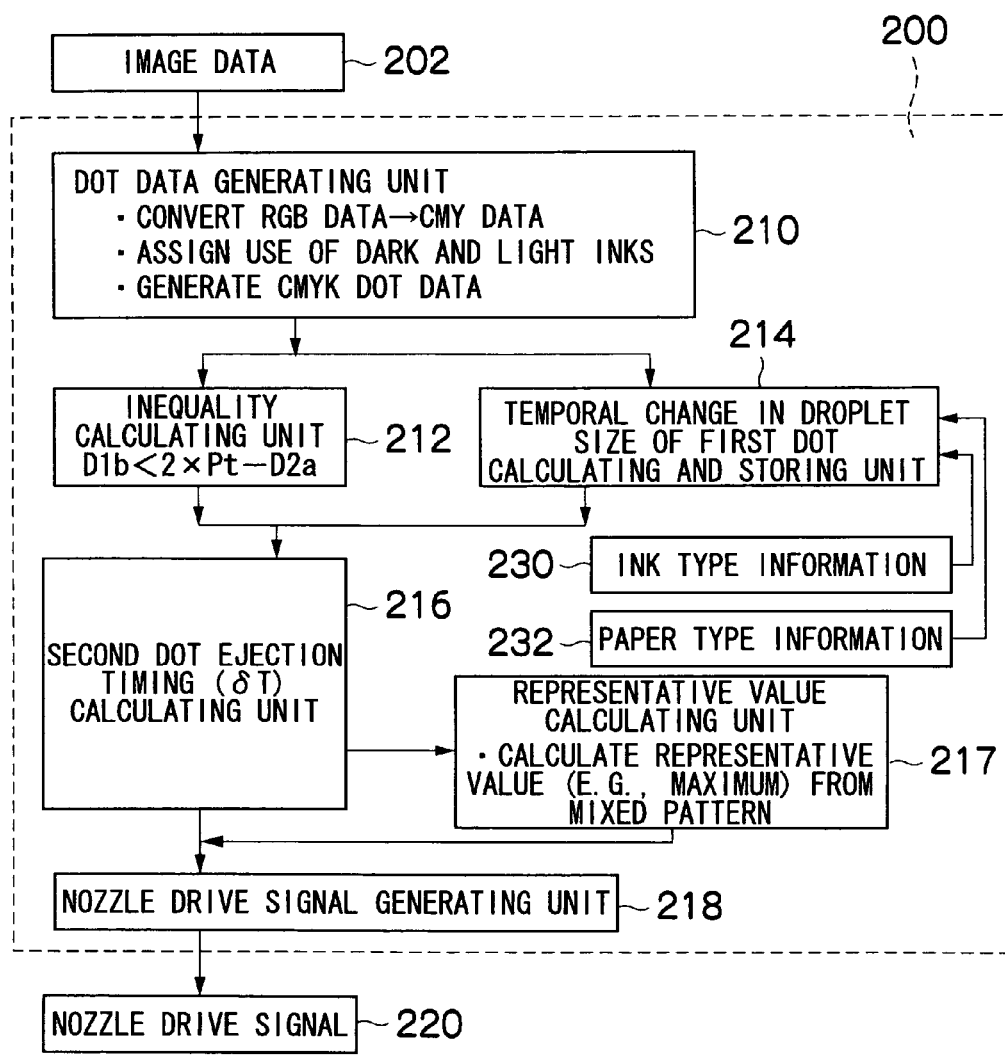
FIG. 13 is a block diagram of a droplet ejection control unit in an inkjet recording apparatus relating to an embodiment of the present invention.

FIG. 13 is a block diagram showing the detailed composition of a droplet ejection controller 200 for executing the droplet ejection control described above. The droplet ejection controller 200 is contained in the system (the print controller 80) shown in FIG. 6.

When image data 202 is obtained from the host computer 86 shown in FIG. 6, a dot data generating unit 210 performs processing for converting the RGB data into CMY data, allocating use of dark and light inks, and generating CMYK dot data.

Thereupon, an inequality calculating unit 212 determines the diameter D1$b$ of the preceding ink droplet (the ink droplet 100 in FIG. 11), according to the pitch Pt between the two dots (for example, the pitch between the ink droplet 100 and the ink droplet 110 shown in FIG. 11), and the diameter D2$a$ of the succeeding ink droplet (the ink droplet 110 in FIG. 11).

Information relating to temporal change in the size of the ink droplets is stored in a dot size calculating and storing unit 214. By referring to this information, a timing calculating unit 216 determines the permeation time δT until the aforementioned value of D1$b$ is reached, from the diameter D1$a$ of the preceding ink droplet upon landing on the paper. In other words, the timing calculating unit 216 determines the droplet ejection interval δT. Furthermore, the timing control parameters in the sub-scanning direction (such as the recording paper conveyance speed), and the timing control parameters in the main scanning direction (such as the interval L between the print head 50A and the print head 50B) are determined from this permeation time value δT.

In a case of a mixed pattern in which there are dots of different diameters, a representative value calculating unit 217 calculates the representative value of the permeation times δT, the representative value of the timing control parameters in the sub-scanning direction (such as the recording paper conveyance speed), and the representative value of the timing control parameters in the main scanning direction (such as the interval L between the print head 50A and the print head 50B), and the like in the mixed pattern. The representative values may be the maximums of the permeation times δT, the timing control parameters in the sub-scanning direction, and the timing control parameters in the main scanning direction, respectively, or may be the minimums, the averages, the most frequent values, or the like of them.

A drive signal 220 for the nozzles is generated by a nozzle drive signal generating unit 218, according to the permeation time δT, and the timing control parameters relating to the sub-scanning direction and the main scanning direction determined in this manner.

Here, the speed at which the ink droplet permeates into the recording paper 16 is determined principally by the type of ink, the type of recording paper 16, the ambient temperature, the humidity, and the like.

The dot size calculating and storing unit 214 stores this various information in the form of a data table, and it calculates the parameters used to derive the permeation time δT and supplies these to the timing calculating unit 216.

Values for the diameter D1$b$ may also be calculated in advance, from the aforementioned diameter D1$a$, the diameter D2$a$ and the dot interval Pt, and registered in a database. The permeation time δT can then be determined by referring to the data relating to the diameter D1$b$ contained in this database. The database may be provided inside the inkjet recording apparatus 10, or it may be provided externally.

Ink type information 230 may be read in and stored when an ink cartridge is installed, and this information may then be supplied to the timing calculating unit 216 when printing is carried out. Similarly, paper type information 232 may be read in and stored when the recording paper 16 is loaded.

The ink type information 230 and the paper type information may be read in automatically from a wireless tag or barcode attached to the ink cartridge, paper tray, or the like, when the cartridge or tray is installed. Alternatively, this information may be input by an operator, via a keyboard or touch panel.

The temporal change in the diameter of the ink droplet for respective ink types and paper types is now described with reference to FIG. 14 and FIG. 15.

Figure 14:
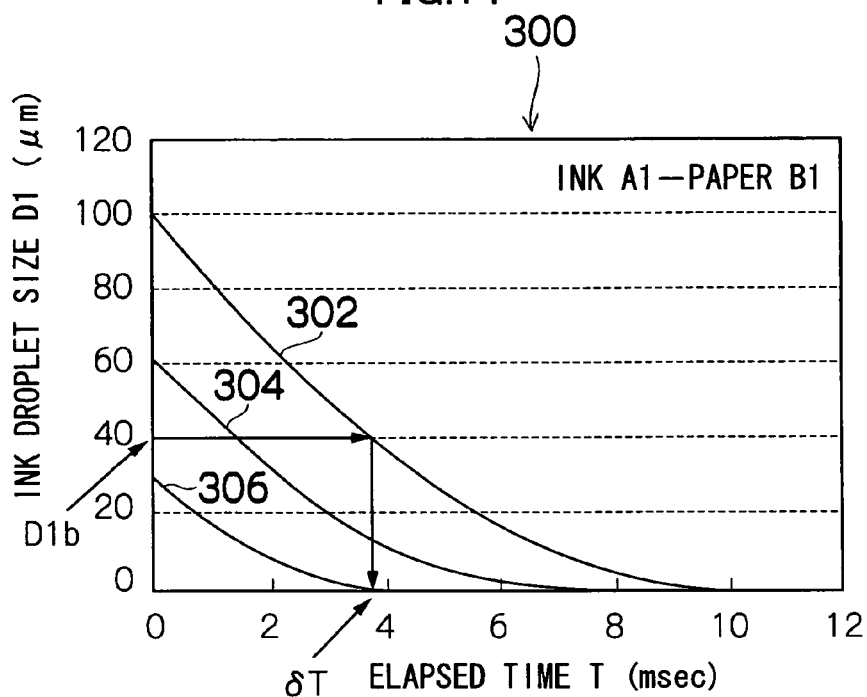
FIG. 14 is a graph showing the relationship between the time elapsed after landing, and the diameter of the ink droplet.

FIG. 14 is a graph 300 showing the change in ink droplet size over time, in a case where ink A1 and paper B1 are used. In the graph 300, curve 302 indicates a case where the ink droplet has a size of 100 μm upon landing on the paper, and curves 304 and 306 respectively indicate cases where the ink droplet has a size of 60 μm and 30 μm upon landing on the paper.

For example, from the curve 302, it can be seen that the time taken for the size of the ink droplet to reduce from 100 μm at landing, to 40 μm, is approximately 3.9 milliseconds (msec). On the other hand, curve 304 shows that the time taken for the ink droplet size to reduce from 60 μm at landing, to 0 μm, (in other words, the time until complete permeation), is 7.0 msec. Thus, although the amount of change in the droplet size is the same as that in the case indicated by curve 302, namely 60 μm, the time required for this change to take place is different, due to the different size of the ink droplet when it lands on the paper.

Therefore, desirably, graph 300 also includes curves for other values of the droplet size upon landing, in addition to curves 302, 304 and 306.

Figure 15:
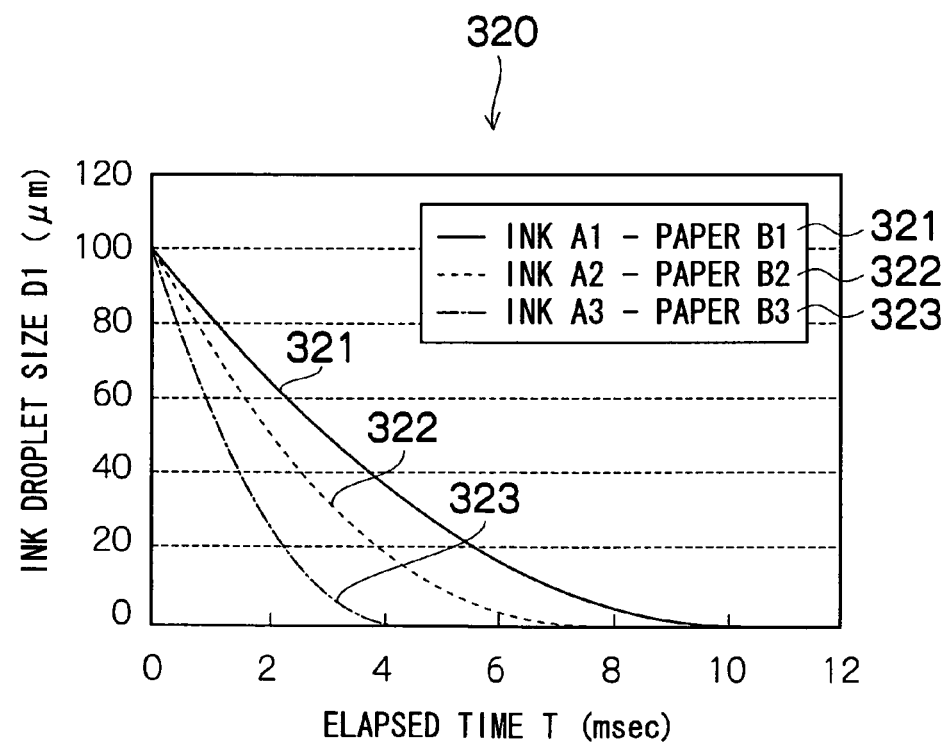
FIG. 15 shows a modification of the graph illustrated in FIG. 14.

FIG. 15 is a graph 320 showing the change over time in the ink droplet size for three types of ink and paper, in the case of a droplet size upon landing of 100 μm. In the graph 320, curve 321 relates to a combination of ink A1 and paper B1, curve 322 relates to a combination of ink A2 and paper B2, and curve 323 relates to a combination of ink A3 and paper B3.

In this way, the time required for a change in the ink droplet size corresponding to the permeation of the ink droplet into the image receiving layer of the recording paper 16 to which ink is permeable or the solidification (curing) of the ink droplet on the recording paper 16 to which ink is not permeable, after landing on the recording paper (in other words, the permeation, solidification, or curing time δT) is determined previously by experimentation, simulation, or the like, for a plurality of combinations of ink types and paper types. These time values are stored in the dot size calculating and storing unit 214.

Here, the time values may be recorded in the form of a graph (using equations based on an approximation for each curve), but desirably, each of the curves is stored in the form of a data table.

It is also possible to store representative values corresponding to various conditions relating to ambient temperature, humidity, and the like, besides the ink type and paper type, in such a manner that values corresponding to the actual ambient conditions can be derived by interpolation.

Moreover, if a type of ink or paper for which no data has been stored is loaded into the printer, then an imaging device, or the like, may be used to capture and measure an actual ink droplet deposited onto the paper, in order that the corresponding permeation time δT can be determined. A line sensor, area sensor, or the like, is preferably used in the imaging device. The print determination unit 24 illustrated in FIG. 1 may be used as this imaging device.

Figure 16:
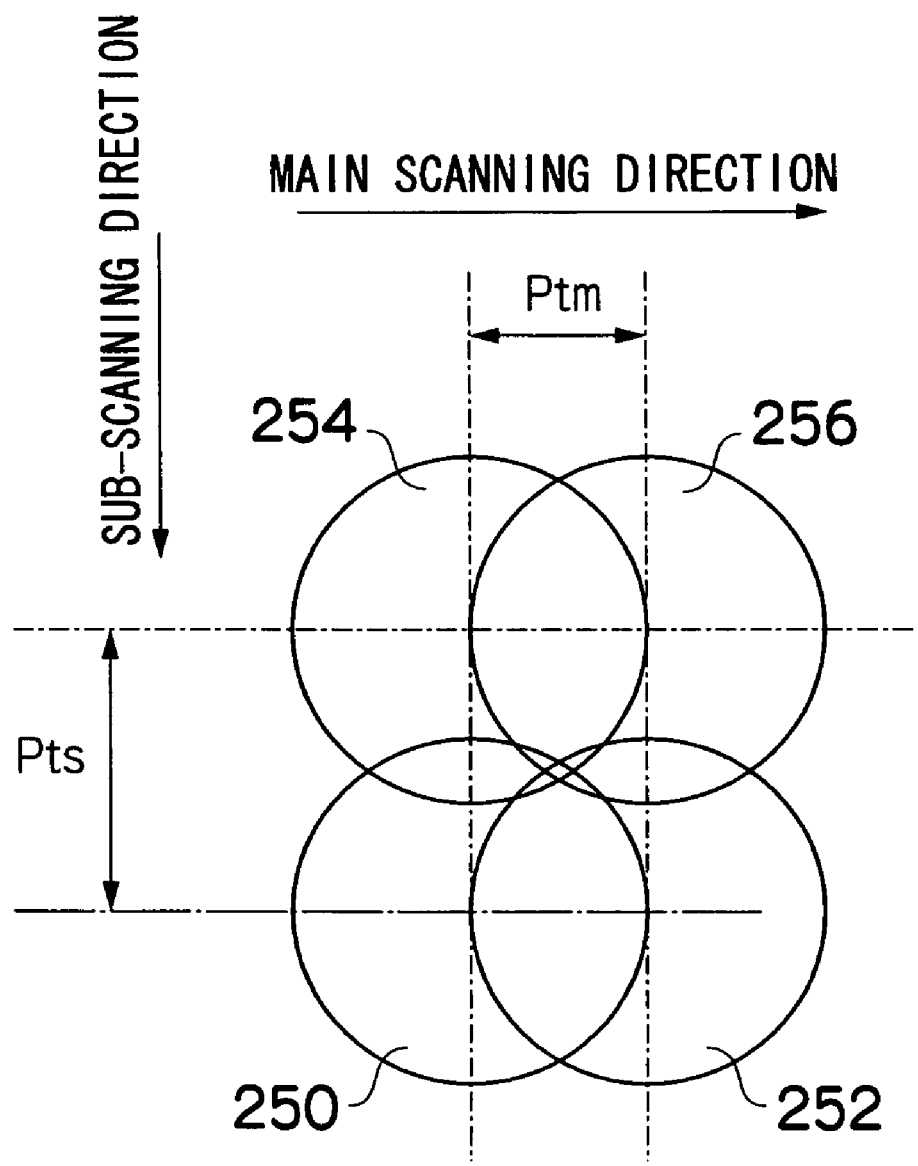
FIG. 16 is a diagram for describing the main scanning direction, the sub-scanning direction, and the droplet ejection interval.

In the present embodiment, if necessary, it is also possible to handle the dot pitch Pts in the sub-scanning direction (the recording paper conveyance direction), separately from the dot pitch Ptm in the main scanning substantially orthogonal to the recording paper conveyance direction, as shown in FIG. 16. Thus, the droplet ejection timing relating to δT, as determined according to the value of D1$b$ obtained from the above-described Formula 1, can also be handled separately in terms of a droplet ejection interval δTm in the main scanning direction and a droplet ejection interval δTs in the sub-scanning direction.

Furthermore, the present invention can also be applied to the droplet ejection timing for dots which are adjacent in an oblique direction, rather than in the main scanning direction or sub-scanning direction, such as dot 250 and dot 256 in FIG. 16.

As illustrated in FIG. 3A, the inkjet recording apparatus 10 has the print head 50A and the print head 50B aligned in the sub-scanning direction, and the interval L between the print head 50A and the print head 50B is variable. Therefore, it is also possible to control the droplet ejection interval δTm between dots that are adjacent in the main scanning direction in the line head, by adjusting the interval L between the print head 50A and the print head 50B and the conveyance speed of the recording paper 16.

In other words, if a dot 250 has been ejected by the print head 50A and a dot 252 adjacent to the dot 250 is to be ejected from the print head 50B, then the droplet ejection interval δTm in the main scanning direction is determined from the conveyance speed Vs of the recording paper 16 and the distance L between the print head 50A and the print head 50B, by means of the following Formula 2:

$$\delta Tm = L/Vs. \quad (2)$$

On the other hand, the droplet ejection interval δTs in the sub-scanning direction is determined from the recording paper conveyance speed Vs and the droplet ejection interval Pts in the sub-scanning direction, by means of the following Formula 3:

$$\delta Ts = Pts/Vs. \quad (3)$$

The foregoing examples have been described with reference to the full line head, but the present invention may also be applied to a serial head (shuttle scan type head). In the serial head, there are two rows of nozzles in the sub-scanning direction, where the distance between the center lines of the two rows is defined as Ls. One nozzle row is displaced by half a pitch with respect to the other nozzle row, thereby forming a staggered matrix arrangement of nozzles. The interval between the nozzle rows can be changed.

The droplet ejection interval δTm in the main scanning direction is determined from the speed of the print head in the main scanning direction (the scanning speed) Vm and the dot pitch Ptm in the main scanning direction, by means of the following Formula 4:

$$\delta Tm = Ptm/Vm. \quad (4)$$

The dot 252 is ejected with respect to the dot 250, and similarly, the dot 256 is ejected with respect to the dot 254, in such a manner that the Formula 4 is satisfied in either case.

Similarly, the droplet ejection interval δTs in the sub-scanning direction is determined from the recording paper conveyance speed Vs and the interval between nozzle rows Ls in the sub-scanning direction, by means of the following Formula 5:

$$\delta Ts = Ls/Vs. \quad (5)$$

The dot 254 is ejected with respect to the dot 250, and similarly, the dot 256 is ejected with respect to the dot 252, in such a manner that the Formula 5 is satisfied in either case.

The present invention may also be applied to cases where mixed patterns combining different dot pitches and dot sizes are used in one image. In mixed patterns of this kind, the control operation can be simplified, by firstly determining the droplet ejection interval δTm in the main scanning direction and the droplet ejection interval δTs in the sub-scanning direction, respectively, for all of the combination of dot pitches and dot sizes, and then using maximum values of these droplet ejection intervals δTm and δTs, namely, δTmax-m and δTmax-s, as representative droplet ejection intervals for that image.

In other words, the droplet ejection intervals for the image are set in accordance with the pattern having the largest droplet ejection interval in the image. The reference value is taken to be the droplet ejection timing for the ink droplets in the overlapping region that is most liable to cause blurring, and the other areas of the image are set to the same droplet ejection timing.

Moreover, it is also possible to allow a safety margin and set the droplet ejection intervals for the image to values greater than the maximum values, δTmax-m and δTmax-s.

Figure 17:
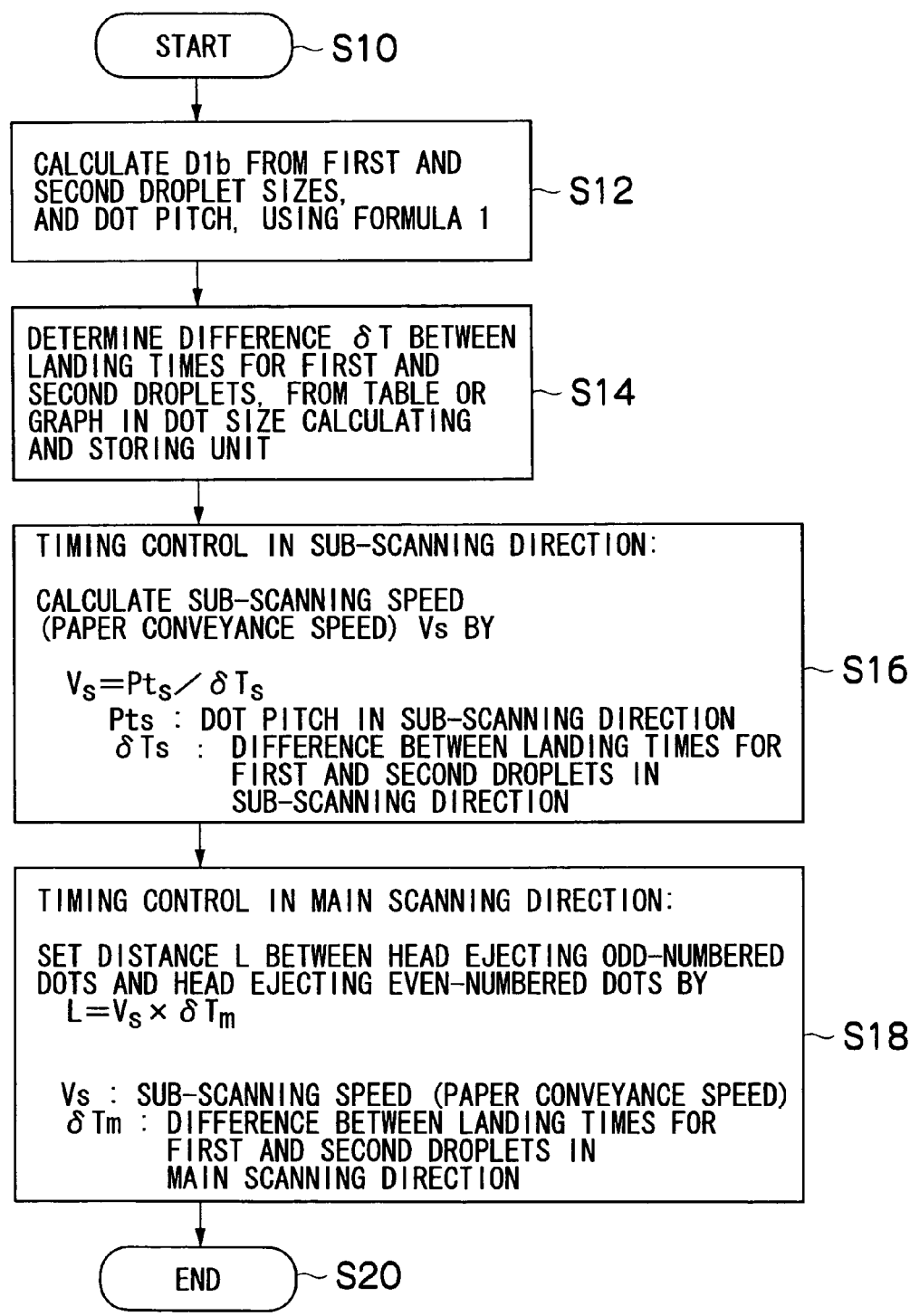
FIG. 17 is a flowchart showing the sequence of droplet ejection control in the inkjet recording apparatus according to the present invention.

FIG. 17 is a flowchart showing the sequence of the droplet ejection timing control described above.

When image data is inputted and print control is started (step S10), the Formula 1 is used to calculate the diameter D1$b$ of the ink droplet 100 forming the first dot 102 (for example, the dot 102 in FIG. 11), according to the dot pitch Pt between the first dot and the second dot (for example, the dot 112 in FIG. 11), and the diameter D2$a$ of the second dot (step S12 in FIG. 17).

Thereupon, the permeation time δT, which indicates the difference between the landing times for the first droplet and the second droplet, is determined according to the diameter D1$a$ upon landing of the ink droplet 100 forming the first dot (the preceding ink droplet) and the value of D1$b$ determined at step S12 (step S14). Here, the value of δT is determined in accordance with the ink type and the paper type by referring to the data tables and graphs 300 and 320 stored in the dot size calculating and storing unit 214 shown in FIG. 13.

Then, timing control in the sub-scanning direction is executed. When the permeation time δT has been determined, the timing calculation section 216 shown in FIG. 13 works out the speed in the sub-scanning direction (the recording paper conveyance speed) Vs according to the Formula 3 (step S16).

Thereupon, timing control in the main scanning direction is executed. The interval L between the print head 50A and the print head 50B shown in FIG. 16 is derived from the Formula 2, and the interval is adjusted to the derived value (step S18).

When an image has been formed while executing the timing control for the sub-scanning direction and main scanning direction in this manner, the printing control sequence terminates (step S20).

The interval L between the print head 50A and the print head 50B may be increased slightly to allow a surplus distance, and the conveyance speed of the recording paper may be changed according to the type of ink or type of paper used.

The present invention can be applied to cases where a dot formed by a subsequently ejected ink droplet (the dot 112 in FIG. 11) overlaps with less than one half of a dot formed by a previously ejected ink droplet (the dot 102 in FIG. 11). In other words, it can be applied to cases satisfying the following Formula 6:

$$D2a/2 < Pt. \quad (6)$$

A program (software) for implementing the droplet ejection control described above can be created, and this program can be installed in the inkjet recording apparatus 10. Moreover, the program can be recorded onto a recording medium (such as a magnetic or optical recording medium) to be distributed and installed in an inkjet recording which can use the recording medium. Furthermore, the program can also be distributed through networks such as the Internet to be installed in an inkjet recording apparatus.

In the inkjet recording apparatus 10 having the aforementioned composition, if overlapping dots are to be formed, then a value is determined for the diameter D1$b$ of a previously ejected ink droplet at which this ink droplet will not combine with a subsequently ejected ink droplet on the surface of the recording paper 16. This value of D1$b$ is determined from the dot pitch Pt and the diameter D2$a$ of the subsequently ejected ink droplet when it lands on the paper.

Moreover, the permeation time δT taken for the size of the preceding ink droplet to reduce from D1$a$ upon landing, to D1$b$, is determined, and droplet ejection is controlled by taking this permeation time δT as the droplet ejection interval between the preceding ink droplet and the succeeding ink droplet.

The succeeding droplet can be ejected without waiting for the complete permeation time T, which is the time taken for the previously ejected ink droplet to permeate completely into the recording paper 16. Therefore, the printing time can be reduced. Furthermore, since the preceding ink droplet and the succeeding ink droplet do not combine on the surface of the recording paper 16, and furthermore, since the preceding ink droplet and the succeeding ink droplet do not combine in the image receiving layer of the recording paper 16 either, then the dot size is not disturbed and the desired dot shape can be obtained.

The droplet ejection interval is dependent on the ink type, the paper type, and ambient conditions, such as temperature and humidity. Therefore, it is calculated in accordance with these conditions. Furthermore, the droplet ejection interval can be determined respectively for both the main scanning direction and the sub-scanning direction, in such a manner that droplet ejection is controlled respectively in the main scanning direction and sub-scanning direction. Therefore, a line head or a serial head may be used as the print head.

In mixed patterns comprising different dot sizes and dot pitches, the droplet ejection interval may be determined for each respective pattern, the maximum value of the droplet ejection interval being taken as the droplet ejection interval for that image. A safety margin may be added to this maximum value.

The inkjet recording apparatus has been described in the above-described embodiments as one example of an image forming apparatus, but the range of application of the present invention is not limited to this. The present invention may also be applied to liquid ejecting apparatuses in general, such as dispensers or coating apparatuses, which eject a liquid, such as water, liquid chemical, or processing liquid, onto an ejection receiving medium.

Next, the pigment ink is described.

Production of Organic Pigment Fine-particles and Dispersion Containing Them

The apparatus for producing the organic pigment used in the embodiments of the present invention is one having a channel capable of forming laminar flow, preferably an apparatus having a channel with an equivalent diameter of 10 mm or smaller, and more preferably an apparatus having a channel with an equivalent diameter of 1 mm or smaller. First, the equivalent diameter is described below.

The equivalent diameter in the embodiments of the present invention is a term also called a corresponding diameter, which is used in mechanical engineering field. If a cylindrical pipe equivalent to the pipe (channel in the embodiments of the present invention) having any sectional shape is assumed, the diameter of the equivalent cylindrical pipe corresponds to the equivalent diameter. The equivalent diameter ($d_{eq}$) is defined as $d_{eq}=4A/p$, where A is a sectional area of the pipe, and p is a wetted perimeter length (circumferential length) of the pipe. In the case of the cylindrical pipe, this equivalent diameter corresponds to the diameter of the cylindrical pipe. The equivalent diameter is used for presuming fluidity or heat conducting characteristic of the pipe on the basis of data of the equivalent cylindrical pipe, and expresses a spatial scale (a representative length) of a phenomenon. The equivalent diameter is: $d_{eq}=4a^2/4a=a$ in a squared pipe having a side (a); $d_{eq}=a/\sqrt{3}$ in an equilateral triangular pipe having a side (a); and $d_{eq}=2h$ in a flow between paralleled plates having a channel height (h) (see, for example, edited by Nippon Kikai Gakkai, "Kikai Kougaku Jiten", 1997, published by Maruzen, K. K.).

When causing water to flow into a pipe, inserting a narrow pipe into the pipe along the central axis thereof and then injecting a colored solution into the water, the colored solution flows in the form of a single line while the flow velocity of the water is small or slow. Thus, the water flows straightly and in parallel to the wall of the pipe. However, when the flow velocity is raised to reach a given flow velocity, turbulence is suddenly caused in the water flow. Consequently, the colored solution is mixed with the water flow so that the whole of the solution and water becomes a colored flow. The former flow is called laminar flow, and the latter flow is called turbulent flow.

Whether a flow turns to a laminar flow or turbulent flow depends on whether or not the Reynolds number, which is a dimensionless number showing the state of the flow, is not more than a given critical value. As the Reynolds number is smaller, a laminar flow is more apt to be caused. The Reynolds number Re of the flow in a pipe is represented by the following equation:

$$Re = D \langle v_x \rangle \rho / \mu,$$

where D is the equivalent diameter of the pipe, $\langle v_x \rangle$ is the sectional average velocity, $\rho$ is the density of the flow, and $\mu$ is the viscosity of the flow. As can be understood from this equation, the Reynolds number is smaller as the equivalent diameter is smaller. Therefore, in the case that the equivalent diameter is in the order of micrometers, a stable laminar flow is apt to be formed. In addition, because the physical properties of the solution, such as the density and the viscosity thereof, also have influence on the Reynolds number. As the density is smaller and/or the viscosity is larger, the Reynolds number is smaller. It can be, therefore, understood that a laminar flow is apt to be formed in that case.

The Reynolds number representing such a critical value is called "critical Reynolds number". The critical Reynolds number is not necessarily definite. However, roughly, the following values are criteria:

| | |
|---|---|
| Re < 2,300 | laminar flow; |
| Re > 3,000 | turbulent flow; and |
| 3,000 ≧ Re ≧ 2,300 | transition state. |

As the equivalent diameter of a channel is smaller, the surface area per unit volume (specific surface area) thereof is larger. When the channel turns into a micro-scale, the specific surface area becomes remarkably large so that the conduction efficiency of heat through the wall of the channel becomes very high. Since the heat conduction time (t) of a fluid flowing in the channel is represented by: $t = d_{eq}^2/\alpha$ (where $\alpha$ is the heat diffusion rate of the fluid), the heat conduction time becomes shorter as the equivalent diameter becomes smaller. That is, if the equivalent diameter becomes ¹/₁₀, the heat conduction time becomes ¹/₁₀₀. Thus, when the equivalent diameter is in a micro-scale, the heat conduction speed is very high.

Precisely, in a micro-size space where the equivalent diameter is in micro scale, flow has a small Reynolds number, and thus, a flow reaction can be conducted with the laminar flow being preferential. In addition, the interface between laminar flows has a very large interface surface area. This enables high-speed and precise mixing of component molecules owing to molecular diffusion between laminar flows, with keeping laminar flows. Further, use can be made of a channel wall having a large surface area, which enables precise temperature control; and controlling the flow rate in flow reaction enables precise control of reaction time. Therefore, among the channels where the laminar flow can be formed according to the embodiments of the present invention, a channel of micro scale that has an equivalent diameter with which the reaction can be highly controlled is defined as a micro reaction site.

As shown in the above explanation of Reynolds number, formation of laminar flow is largely influenced not only by the size of equilibrium diameter of the channel but also by flowing conditions that include solution physical properties such as viscosity and density. Therefore, in the embodiments of the present invention, the equivalent diameter of the channel is not particularly limited as long as a laminar flow is formed in the channel. The equivalent diameter is preferably of a size with which a laminar flow easily forms. The equivalent diameter of the channel is preferably 10 mm or less, and it is more preferably 1 mm or less since a micro reaction site can be formed. The equivalent diameter is further preferably 10 μm to 1 mm, and particularly preferably 20 μm to 300 μm.

A typical example of the reaction apparatus (reactor) having such a micro-scale size flow path (channel), which can be particularly preferably used in the embodiments of the present invention, is commonly called "microreactor" and is being developed greatly in recent years (see, for example, W. Ehrfeld, V. Hessel, and H. Loewe, "Microreactor", 1st Ed. (2000) Wiley-VCH).

The above-mentioned general micro-reactor is provided with plural micro-channels each having an equivalent diameter (obtained by converting the section thereof to a corresponding circle) of several micrometers to several hundred micrometers; and a mixing space connected to these micro-channels. In the micro-reactor, plural solutions are introduced through the plural micro-channels into the mixing space, thereby mixing the solutions, or mixing the solutions and simultaneously causing chemical reaction.

Next, the following describes major different points of reaction by use of the micro-reactor from reaction based on a batch type by use of a tank or the like. In chemical reaction of a liquid phase and chemical reaction in two liquid phases, molecules generally encounter each other on the interface between the reaction solutions, to cause the reaction. Therefore, when the reaction is conducted in a microscopic space (micro-channel), the area of the interface becomes large in relation to the space so that the efficiency of the reaction increases remarkably. In addition, about the diffusion of molecules, the diffusion time is in proportion with the square of diffusion distance. This fact means that as the scale is made smaller, the mixing of the reaction solutions advances more by the diffusion of the molecules, so as to cause the reaction more easily even if the reaction solutions are not actively mixed. Further, in the microscopic space, flows have small Reynolds numbers (dimensionless number by which the flow is characterized), the flows tend to turn preferentially to laminar flows. Therefore, the molecules existent in the solutions are exchanged from one laminar flow to another laminar flow on the interface where the solutions are in the states of laminar flows, and the transferred molecules cause precipitation or reaction.

When a micro-reactor, which has characteristics as described above, is used, the reaction time and temperature between the solutions therein can be more precisely controlled, compared with a conventional batch system, in which, for example, a tank having a large volume is used as a reaction site. Further, in the batch system, in particular, between solutions having a large reaction speed, sometimes reaction advances on a reaction contact face generated at the initial stage of mixing the solutions, and further a primary product generated by the reaction between the solutions subsequently undergoes reaction in the container. Therefore, there may be a possibility that the resultant product becomes non-homogeneous or crystals of the product grow beyond necessity in the mixing container (batch) to get coarse. Contrary to the above, according to a micro-reactor that can be used in the embodiments of the present invention, solutions hardly remain in the mixing space (e.g., a mixing container) so as to flow continuously. Consequently, it is possible to restrain a primary product generated by the reaction between the solutions from undergoing subsequent reaction while the primary product remains in the mixing space. Thus, a pure primary product, which has been hardly taken out hitherto, can be taken out. Moreover, it becomes difficult that crystals aggregate in the mixing space or get coarse.

Further, when a chemical substance that can be produced in only a small amount by use of an experimental producing-apparatus, is tried to produce in a large amount by use of large-scale manufacturing facilities (i.e., scaling up), huge labor and very long period of time have been required hitherto, to gain the reproducibility of the manufacture in large-scale manufacturing facilities of a batch system as similar as the reproducibility of the production in the experimental producing-apparatus. However, by arranging a plurality of producing lines each using a micro-reactor in parallel (numbering-up) according to a necessary production quantity, labor and time period for gaining such the reproducibility may be largely reduced.

The method for forming the channel of the laminar flow that can be used in the embodiments of the present invention will be explained. It is relatively easy to form a channel with a size of 1 mm or more with generally known micro machining techniques, while it is exceptionally difficult to form a channel with a size of 1 mm or less (micro size), especially with a size of 500 μm or less. A micro-size channel (microchannel) is formed on a solid substrate by micro processing technique in many cases. The material of the substrate may be any stable material that is not apt to be corroded. Examples of the material include metal (e.g., stainless steel, hastelloy (Ni-Fe based alloy), nickel, aluminum, silver, gold, platinum, tantalum, and titanium), glass, plastics, silicone, PTFE (polytetrafluoroethylene), and ceramics.

Representative examples of the micro processing technique for producing the micro-channel include a LIGA (Roentgentiefen-Lithographie, Galvanik und Abformung) method using X-ray lithography, a high aspect ratio photolithography method using EPON SU-8 (trade name), a micro discharge processing method (μ-EDM (micro electro discharge machining)), a high aspect ratio processing method for silicon by deep RIE (reactive ion etching), a hot emboss processing method, a photo-fabrication method, a laser processing method, an ion beam processing method, and a mechanical micro cutting method using a micro tool made of such a hard material as diamond. These techniques may be used alone or in combination. Preferable micro processing techniques are the LIGA method using X-ray lithography, the high-aspect ratio photolithography method using EPON SU-8, the micro discharge processing method (μ-EDM), and the mechanical micro cutting processing method. In recent years, investigations have been made for applying a micro-injection molding technique to engineering plastics.

When the micro-channel is assembled, a joining technique is often used. A normal joining technique is roughly divided into solid-phase joining and liquid-phase joining. In joining methods generally used, a typical joining method includes pressure welding and diffusion bonding as the solid-phase joining; and welding, eutectic bonding, soldering, and gluing as the liquid joining. Further, at the time of assembling, it is desirable to use a highly precise joining method in which dimension accuracy is maintained in such a way that deterioration of material due to high temperature heating, or destruction of a micro-structure such as a flow passage by a large deformation of material does not take place. Such a technique includes a silicon direct joining, anode joining, surface activation joining, direct joining using hydrogen bond, joining using aqueous HF solution, Au—Si eutectic bonding, and void-free bonding.

The micro-channels that can be used in the embodiments of the present invention are not limited to channels formed on a solid substrate by use of the micro processing technique, and may be, for example, various available fused silica capillary tubes each having an inner diameter of several micrometers to several hundred micrometers. Various silicon tubes, fluorocarbon resin tubes, stainless steel pipes, and PEEK (polyetheretherketone) pipes each having an inner diameter of several micrometers to several hundred micrometers, which are commercially available as parts for high-performance liquid chromatography or gas chromatography, can also be used.

Hitherto, with respect to micro-reactors, devices that are aimed to improve reaction efficiency and the like, have been reported. For example, Japanese Patent Application Publication Nos. 2003-210960, 2003-210963 and 2003-210959 are concerned with micro-mixers. In the embodiments of the present invention, these micro-devices may also be used.

The micro-channel that can be used in the embodiments of the present invention may be subjected to a surface treatment according to an object. In particular, when an aqueous solution is treated in the micro-channel, since the adsorption of the solute to the surface of glass or silicon may become a problem, the surface treatment is important. In the fluid control in the micro-sized flow passage, it is desirable to realize this without incorporating a movable part requiring a complicated manufacturing process. For example, a hydrophilic region and a hydrophobic region are prepared in the channel by the surface treatment, so that it becomes possible to treat a fluid by using a difference in surface tension exerting on the boundary between these regions. The method used for surface-treating glass or silicon in many cases is hydrophobic or hydrophilic surface-treatment by using a silane coupling agent.

In order to introduce a reagent, sample, or the like into the channels and mix, a fluid control function is needed. Specifically, since the behavior of the fluid in the micro-channel has properties different from those of a macro-scale, a control method appropriate for the micro-scale should be considered. A fluid control method is classified into a continuous flow system and a droplet (liquid plug) system according to the formation, while it is also classified into an electric driving system and a pressure driving system according to the driving force.

A more detailed description of these systems will be given hereinafter. The most widely used system as a formation for treating a fluid is the continuous flow system. When the flow is controlled in the continuous flow system, generally, the entire portion inside the micro-channel is filled with a fluid, and the fluid as a whole is driven by a pressure source such as a syringe pump that is provided outside the channel. In this method, although there is such a difficulty that dead volume is large, and the like, the continuous flow system has such a great merit that the control system can be realized with a relatively simple set-up.

As a system which is different from the continuous flow system, there is provided the droplet (liquid plug) system. In this system, droplets partitioned by air are made to move inside the reactor or inside the channel leading to the reactor, and each of the droplets is driven by air pressure. During this process, a vent structure for allowing air between droplets and channel walls, or air between the droplets, to escape to the outside as necessary; a valve structure for maintaining pressure inside the branched channels independently from pressure at other portions; and the like, must be provided inside the reactor system. Further, a pressure control system that is formed by a pressure source or a switching valve must be provided outside the reactor system in order to move the droplets by controlling the pressure difference. Thus, in the liquid droplet system, although the apparatus configuration and the structure of the reactor become rather complicated as stated above, a multi-stage operation is enabled, for example, plural droplets are individually operated and some reactions are sequentially performed, and the degree of freedom concerning the system configuration becomes high.

As the driving system for performing the fluid control, there are generally and widely used an electrical driving method in which a high voltage is applied between both ends of a flow passage (channel) to generate an electro-osmotic flow, thereby fluid is moved; and a pressure driving method in which a pressure is applied to a fluid to move the fluid using a pressure source provided at the outside of the passage. It has been known that both systems are different in that, for example, as the behavior of the fluid, the flow velocity profile in the cross-section of the flow passage becomes a flat distribution in the case of the electrical driving system, whereas it becomes a hyperbolic flow distribution in the pressure driving system, in which the flow velocity is high at the center of the flow passage and low at the wall surface part. Therefore, the electrical driving system is suitable for such an object that a movement is made while the shape of a sample plug or the like is kept. In the case where the electrical driving system is performed, since it is necessary that the inside of the flow passage is filled with the fluid, the form of the continuous flow system must be adopted. However, since the fluid can be treated by an electrical control, a comparatively complicated process is also realized, for example, a concentration gradient varying with time is formed by continuously changing the mixing ratio of two kinds of solutions. In the case of the pressure driving system, the control can be made irrespective of electrical properties of the fluid, and secondary effects such as heat generation or electrolysis may not be considered, and therefore, an influence on the substrate (component) hardly exists, and its application range is wide. On the contrary, a pressure source must be prepared outside, and it is necessary to automate the complicated process while considering that, for example, response characteristics to manipulation are changed according to the magnitude of a dead volume of a pressure system.

In the embodiments of the present invention, although a method to be used as a fluid control method is suitably selected according to its object, the pressure driving system of the continuous flow system is preferable.

The temperature control of the channel for use in the embodiments of the present invention may be performed by putting the whole device having a passage in a container in which the temperature is controlled; or forming a heater structure such as a metal resistance wire or polysilicon in the device, and performing a thermal cycle in such a manner that the heater structure is used when heating, and cooling is natural cooling. With respect to the sensing of temperature, when a metal resistance wire is used, it is preferable that the same resistance wire as the heater is additionally formed, and the temperature measurement is performed on the basis of the change of the resistance value of the additional wire. When the polysilicon is used, it is preferable that a thermocouple is used to measure the temperature. Further, heating and cooling may be performed from the outside by bringing a Peltier element into contact with the channel. A suitable method is selected in accordance with the use, the material of the channel body, and the like.

In the embodiments of the present invention, the production of the pigment or the preparation of the pigment dispersion is performed while flowing the solutions in a channel(s), that is, by a continuous flowing method. Thus, the reaction time is controlled by a time during which the channel retains the flow (i.e., retention time). When the equivalent diameter is constant, the retention time is determined by the length of the channel and the induction speeds of the reaction solutions. Further, the length of the channel is not particularly limited, but it is preferably 1 mm or more but 10 m or less, more preferably 5 mm or more but 10 m or less, and particularly preferably 10 mm or more but 5 m or less.

The number of channels that can be used in the embodiments of the present invention may be any number appropriately provided with a reactor. The number of channels may be one. Alternately, many channels may be arranged in parallel (i.e., numbering-up) as needed, to increase a processing amount thereof.

Typical examples of a reactor that can be used in the embodiments of the present invention are illustrated in FIGS. 18A to 21. Needless to say, the present invention is not limited to these examples.

Figure 18A:
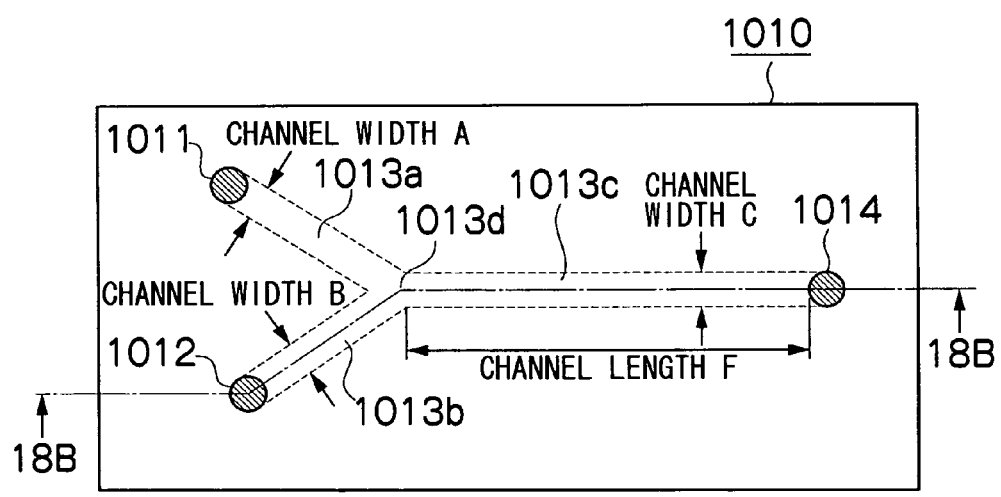
FIG. 18A is an explanatory view of a reactor having on one side thereof a Y-shaped channel.
Figure 18B:
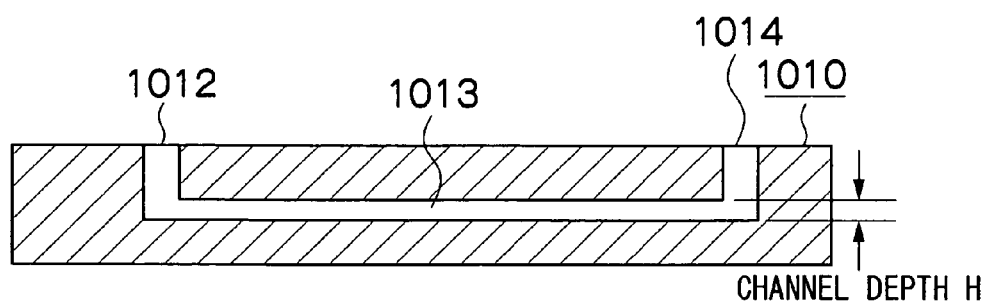
FIG. 18B is a sectional view along the line 18B-18B in FIG. 18A.

FIG. 18A is an explanatory view of a reactor 1010 having a Y-shaped channel. FIG. 18B is a sectional view of the reactor taken on line 18B-18B in FIG. 18A. The shape of the section perpendicular to the direction of the length of the channel is varied dependently on the micro processing technique to be used, and is a shape close to a trapezoid or a rectangle. When widths and depths (in particular, the width C and the depth H) of the Y-shaped channel are made into micro-sizes, solutions introduced from introducing ports 1011 and 1012 with pumps or the like are caused to flow via introducing channels 1013a and 1013b, respectively, and are brought into contact with each other at a fluid confluence point 1013d to form stable laminar flows to flow through a reaction channel 1013c. While the solutions flow as the laminar flows, a solute contained in a laminar flow is mixed or reacted with another solute contained in another laminar flow by molecular diffusion on the interface between the laminar flows. Solutes, which diffuse very slowly, may not be diffused or mixed between the laminar flows; and, in some cases, the solutes are not mixed until they reach a discharge port 1014. In such a case that the two introduced solutions are easily mixed in a flask, the flow of the mixed solutions may become homogeneous flow in the discharge port if the channel length F is made long. However, when the channel length F is short, laminar flows are kept up to the discharge port. When the two introduced solutions are not mixed in a flask and are separated into phases, the two solutions naturally flow as laminar flows to reach the discharge port 1014.

Figure 19A:
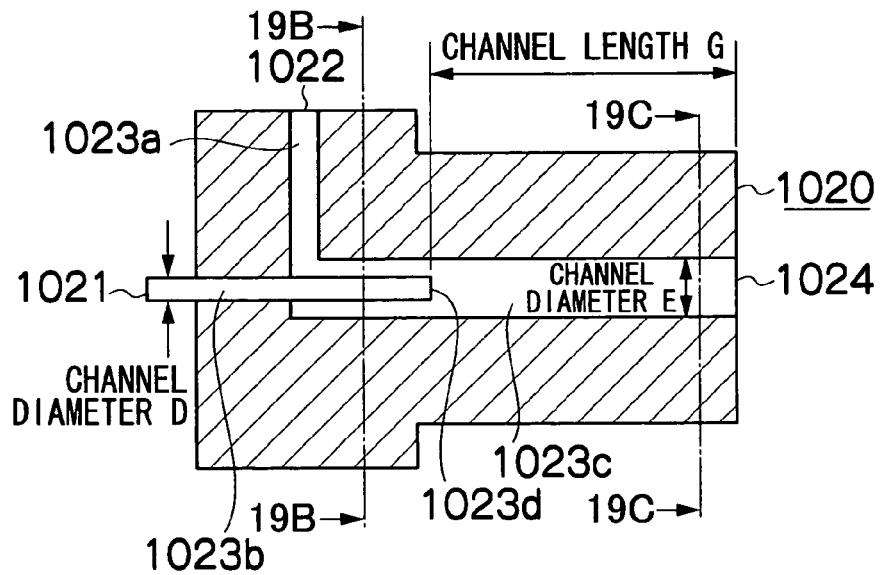
FIG. 19A is an explanatory view of a reactor having a cylindrical tube-type channel in which a channel is provided to insert at one side thereof.
Figure 19B:
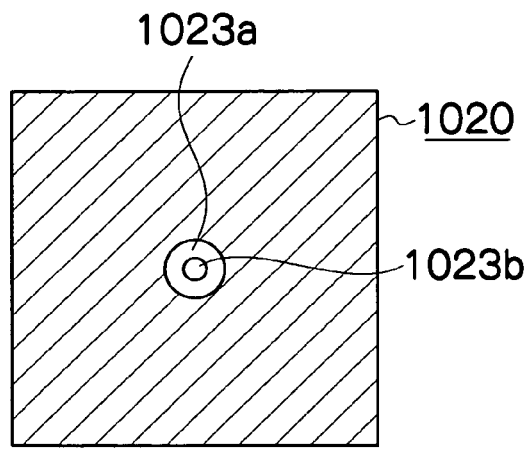
FIG. 19B is a sectional view along the line 19B-19B in FIG. 19A.
Figure 19C:
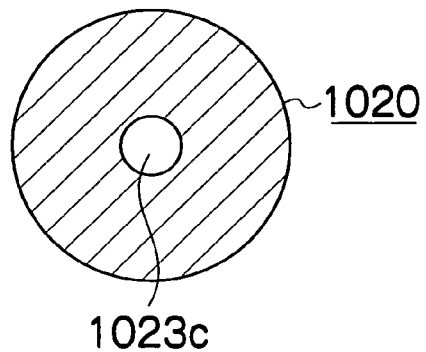
FIG. 19C is a sectional view along the line 19C-19C in FIG. 19A.

FIG. 19A is an explanatory view of a reactor 1020 having a cylindrical pipe-type channel in which a channel is inserted at one side thereof. FIG. 19B is a sectional view of the reactor taken on line 19B-19B in FIG. 19A, and FIG. 19C is a sectional view of the reactor taken on line 19C-19C in FIG. 19A. The shape of the section perpendicular to the lengthwise direction of the channel is a circular shape or a shape close thereto. When the channel diameters D and E of the cylindrical pipes are micro-sizes, solutions introduced from introducing ports 1021 and 1022 with pumps or the like are caused to flow via introducing channels 1023b and 1023a, respectively, and are brought into contact with each other at a fluid confluence point 1023d to form stable cylindrical laminar flows to flow through a reaction channel 1023c. While the solutions flow as the cylindrical laminar flows, solutes contained in the separate laminar flows are mixed or reacted with each other by molecular diffusion on the interface between the laminar flows. This matter is the same as in the case of the reactor shown in FIG. 18A. The apparatus having the cylindrical pipe-type channel has the following characteristics: that the apparatus can make the contact interface between the two solutions larger than the apparatus shown in FIG. 18A; and since the contact interface has no portion to contact the wall face of the apparatus, it does not happen that crystal growth is caused from the contact portion with the wall face as in the case that a solid (crystal) is generated by reaction, thereby the apparatus gives only a low possibility that the channel is blocked.

Figure 20A:
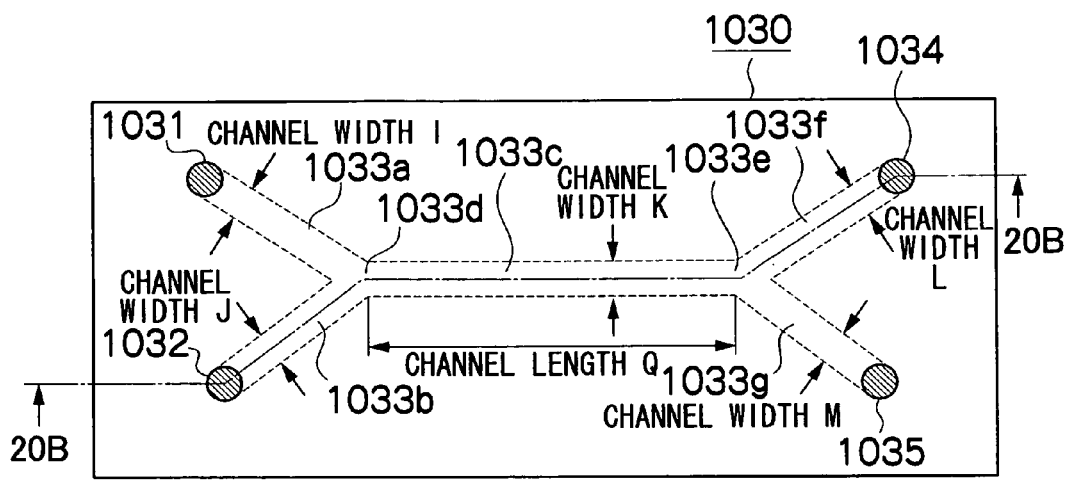
FIG. 20A is an explanatory view of a reactor having on both sides thereof Y-shaped channels.
Figure 20B:
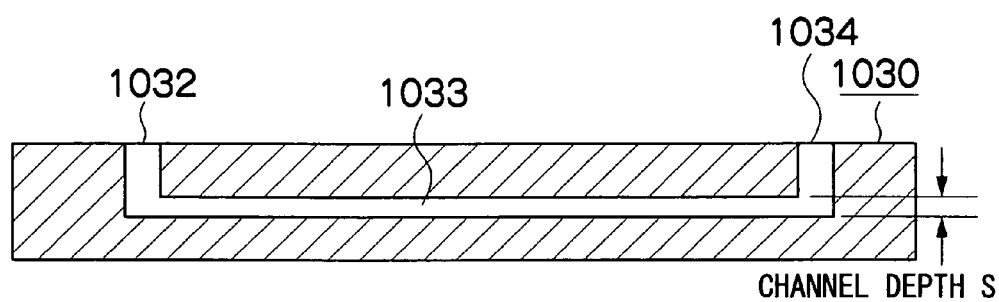
FIG. 20B is a sectional view along the line 20B-20B in FIG. 20A.
Figure 21:
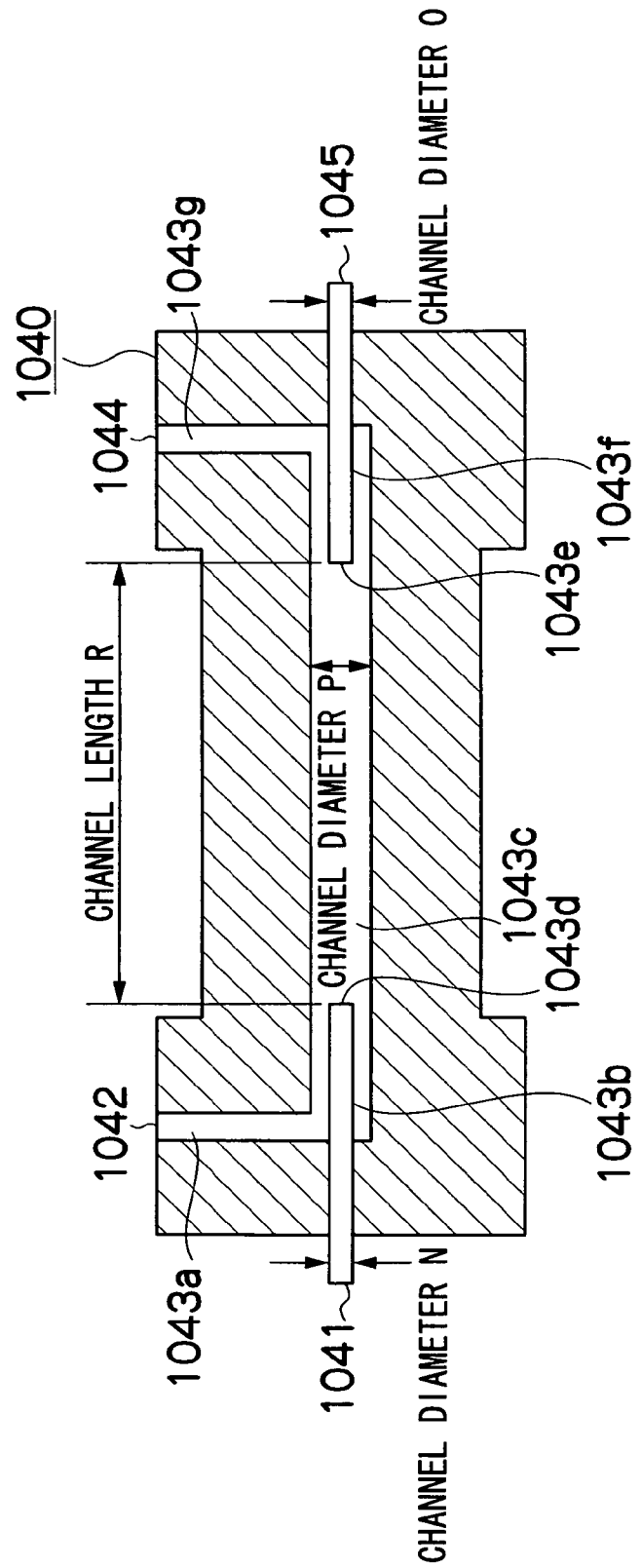
FIG. 21 is an explanatory view of a reactor having a cylindrical tube-type channel in which channels are provided to insert at both sides thereof.

FIGS. 20A and 21 are explanatory views of reactors 1030 and 1040 obtained by improving the reactors illustrated in FIGS. 18A and 19A, respectively, in order that when flows of two solutions arrive at outlets in the state that the flows are laminar flows, the laminar flows can be separated from each other. FIG. 20B is a sectional view of the reactor 1030 taken on line 20B-20B in FIG. 20A. When these apparatuses are used, reaction and separation can be attained at the same time. It is also possible to avoid phenomena that the two solutions are finally mixed so that the reaction between the solutions advances excessively, and that generated crystals get coarse. In the case that products or crystals are selectively present in one of the solutions, the products or crystals can be obtained with a higher concentration than in the case that the two solutions are mixed. Further, by linking a plurality of the apparatuses sequentially, there are such advantages that an extracting operation is effectively performed.

(1) Production of Dispersion Containing Organic Pigment Fine-particles by Micro-reactor In the embodiments of the present invention, a solution in which an organic pigment is homogeneously dissolved in an alkaline or acidic aqueous medium, is caused to flow, as a laminar flow, through the channel as described above, and in the course of this step of laminar flowing, the hydrogen ion exponent (pH) of the solution is changed, thereby producing organic pigment fine-particles and a dispersion containing the fine-particles. This is described in detail hereinafter.

The organic pigment produced in the embodiments of the present invention is not limited in the color tone thereof, and it may be a magenta pigment, a yellow pigment, or a cyan pigment. Specifically, the organic pigment may be a magenta pigment, a yellow pigment or a cyan pigment of a perylene-, perynone-, quinacridone-, quinacridonequinone-, anthraquinone-, anthanthrone-, benzimidazolone-, disazo-condensation-, disazo-, azo-, indanthrone-, phthalocyanine-, triaryl-carbonium-, dioxazine-, aminoanthraquinone-, diketopyrrolopyrrole-, thioindigo-, isoindoline-, isoindolinone-, pyranthrone- or isoviolanthrone-series pigments, or a mixture thereof.

Preferred pigments are quinacridone-, diketopyrrolopyrrole-, disazo-condensation- or phthalocyanine-series pigments; and particularly preferred pigments are quinacridone-, disazo-condensation-, or phthalocyanine-series pigments.

In the embodiments of the present invention, two or more kinds of the organic pigments or a solid solution of the organic pigments, or a combination of the organic pigment with an inorganic pigment may be used.

It is necessary that the organic pigment is homogeneously dissolved in an alkaline or acidic aqueous medium. It depends on the nature of the pigment whether the organic pigment in interest may be more easily dissolved homogeneously under either alkaline or acidic, to select the conditions in which the organic pigment be dissolved under alkaline or dissolved under acidic. In general, in the case of the pigment having in the molecule thereof a group dissociative under alkaline, the alkaline medium is used, and in the case of the pigment having no group dissociative under alkaline and having in the molecule thereof many nitrogen atoms to which protons are easily added, the acidic medium is used. For example, quinacridone-, diketopyrrolopyrrole-, and disazo-condensation-series pigments are dissolved in the alkaline medium, and phthalocyanine-series pigments are dissolved in the acidic medium.

Examples of a base that can be used in the case that the pigment is dissolved in an alkaline aqueous medium, include inorganic bases, such as sodium hydroxide, calcium hydroxide, and barium hydroxide; and organic bases, such as trialkylamine, diazabicycloundecene (DBU), and metal alkoxides. Among these, the inorganic bases are preferable.

The amount of the base to be used is not particularly limited, as long as the base in the amount can make the pigment be dissolved homogeneously. In the case of the inorganic base, the amount thereof is preferably from 1.0 to 30 mole equivalents, more preferably from 2.0 to 25 mole equivalents, and further preferably from 3 to 20 mole equivalents, to the pigment. In the case of the organic base, the amount thereof is preferably from 1.0 to 100 mole equivalents, more preferably from 5.0 to 100 mole equivalents, and further preferably from 20 to 100 mole equivalents, to the pigment.

Examples of an acid that can be used in the case that the pigment is dissolved in an acidic aqueous medium, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can make the pigment be dissolved homogeneously. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably from 30 to 200 mole equivalents, to the pigment.

The following describes the aqueous medium. The aqueous medium in the embodiments of the present invention is water alone, or a mixed solvent with an organic solvent soluble in (or miscible with) water. The addition of the organic solvent is performed in the case that, according to use of only water, it is impossible to homogeneously dissolve the pigment or a dispersing agent, or it is impossible to obtain a viscosity necessary for flow in the channel, and in the case necessary for forming laminar flow. Thus, the addition of the water-soluble organic solvent is not essential, but is performed in many cases. Examples of the organic solvent to be added include polyhydric-alcohol-series solvents, typified, for example, by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower monoalkyl ether of a polyhydric alcohol series solvents, such as ethylene glycol monomethyl(or monoethyl) ether, diethylene glycol monomethyl (or monoethyl) ether, and triethylene glycol monoethyl(or monobutyl) ether; polyether-series solvents, such as ethylene glycol dimethyl ether (monoglyme), diethylene glycol dimethyl ether (diglyme), and triehtylene glycol dimethyl ether (triglyme); amide-series solvents, such as dimethylformamide, dimethylacetamide, 2-pyrrolidone, N-methyl-2-pyrrolidone, 1,3-dimethyl-2-imidazolidinone, urea, and tetramethyl urea; sulfur-containing solvents, such as sulfolane, dimethylsulfoxide, and 3-sulfolene; polyfunctional solvents, such as diacetone alcohol, and diethanolamine; carboxylic-acid-series solvents, such as acetic acid, maleic acid, docosahexaenoic acid, trichloroacetic acid, and trifluoroacetic acid; and sulfonic-acid-series solvents, such as methanesulfonic acid, and trifluorosulfonic acid. These solvents may be mixed in combination with two or more thereof, and used.

The organic solvent is preferably an amide-series solvent or a sulfur-containing solvent in the case of alkaline, and a carboxylic-acid-series solvent, a sulfur-containing solvent or a sulfonic-acid-series solvent in the case of acidic; more preferably the sulfur-containing-series solvent in the case of alkaline, and a sulfonic-acid-series solvent in the case of acidic; and particularly preferably dimethylsulfoxide (DMSO) in the case of alkaline, and methanesulfonic acid in the case of acidic.

The blend ratio of water to the organic solvent is not particularly limited, as long as at the ratio it is possible to dissolve the pigment to be used homogeneously. The blend ratio of water to the organic solvent is preferably from 0.05 to 10 (mass ratio) in the alkaline aqueous medium. In the case that an inorganic acid is used in the acidic aqueous medium, it is preferable to use, for example, sulfuric acid alone without using any organic solvent. When an organic acid(s) is used, the organic acid itself is an organic solvent, and a plurality of acids are mixed or water is added thereto in order to adjust the viscosity and the solubility of the aqueous medium. Preferably, the mass ratio of water to the organic solvent(s) (organic acid(s)) is from 0.005 to 0.1.

In the embodiments of the present invention, it is preferred to introduce into the channel a solution homogeneously dissolving an organic pigment(s) or a material(s) therefor. When a suspension is introduced into the channel, the size of the particles therein becomes large or pigment fine-particles having a wide particle size distribution are generated. This results, as the case may be, to be apt to block the channel. The wording "homogeneously dissolving" means a solution in which turbidity (muddiness) is hardly observed when the solution is observed under visible light. In the embodiments of the present invention, a solution obtained by filtration through a micro-filter having no pores larger than 1 μm in diameter, or a solution which does not contain any substance removed by the action of a filter having pores of 1 μm or less in diameter, is defined as a homogeneously dissolved solution (or a homogeneous solution).

The following describes the hydrogen ion exponent (pH). The hydrogen ion exponent (pH) is the common logarithm of the reciprocal number of a hydrogen ion concentration (molar concentration), and may be called the hydrogen exponent. The hydrogen ion concentration is the concentration of hydrogen ions $H^+$ in a solution, and means the mole number of hydrogen ion present in a 1-liter solution. Since the hydrogen ion concentration changes in a very wide range, it is usually represented by the hydrogen ion exponent (pH). For example, a 1-liter pure water contains $10^{-7}$ mol of hydrogen ions at 1 atmosphere and 25° C. Thus, the pH thereof is 7, which is neutral. The aqueous solution having a pH of less than 7 is acidic, and the aqueous solution having a pH of more than 7 is alkaline. As a method of measuring the pH value, there are potentiometric and colorimetric measuring methods.

In the embodiments of the present invention, the hydrogen ion exponent (pH) is changed in the step of causing the solution to flow in a channel, thereby producing pigment fine particles. This process is performed using a channel having an introducing port different from an introducing port for the homogeneous solution of the organic pigment, for example, a channel having at least two introducing ports as illustrated in FIG. 18A or 19A. Specifically, a homogeneous solution of an organic pigment is introduced into the introducing port 1011 in FIG. 18A or the introducing port 1021 in FIG. 19A, and neutral, acidic or alkaline water or an aqueous solution in which a dispersing agent is dissolved is introduced into the introducing port 1012 in FIG. 18A or the introducing port 1022 in FIG. 19A. The two solutions are brought into contact with each other in the channel 1013c or 1023c, thereby changing the hydrogen ion concentration, that is, the hydrogen ion exponent (pH), of the solution containing the organic pigment toward neutrality (pH 7). In the case that the equivalent diameter of the channel is in a micro-scale, any flow therein has a small Reynolds number. Consequently, stable laminar flows (cylindrical laminar flows in FIG. 19A) are formed, and water and ions diffuse and transfer through a stable interface between the two flows so that the hydrogen ion exponent (pH) of the solution containing the organic pigment is gradually changed toward neutrality. The pigment is not easily dissolved in an aqueous medium at a low alkalinity or a low acidity, therefore, as the hydrogen ion exponent (pH) of the solution containing the organic pigment is changed toward neutrality, pigment fine particles are gradually precipitated.

In the case that pigment fine particles are produced from a pigment dissolved in an alkaline aqueous medium, the change of the hydrogen ion exponent (pH) is generally performed within the range of 16.0 to 5.0, preferably 16.0 to 10.0. In the case that pigment fine particles are produced from a pigment dissolved in an acidic aqueous medium, the change of the hydrogen ion exponent (pH) is generally performed within the range of 1.5 to 9.0, preferably 1.5 to 4.0. The range of the change depends on the value of the hydrogen ion exponent (pH) of the organic pigment solution, but the range may be a range sufficient for promoting the precipitation of the organic pigment.

The pigment fine particles generated in the channel of a micro-scale do flow into an outlet in the state that the particles are contained in one of the laminar flows, without diffusing. Therefore, when a channel apparatus having outlets designed, as illustrated in FIG. 20A or 21, is used, the laminar flow containing the organic pigment fine-particles can be separated. When this method is used, a high-concentration pigment dispersion can be obtained, and simultaneously the water-soluble organic solvent, the alkaline or acidic water, and an excessive of the dispersing agent used to prepare the homogeneous solution can be removed. Thus, this process is advantageous. It is also possible to avoid the following: that the two solutions are finally mixed so that pigment crystals get coarse or deteriorate.

When pigment fine particles are produced, the reaction temperature inside the channel is preferably within such a range that the solvent is not solidified or vaporized, and it is preferably from −20 to 90° C., more preferably from 0 to 50° C., and particularly preferably from 5 to 15° C.

When pigment fine particles are produced, the flow velocity (flow rate) of the fluid which flows in the channel is advantageously from 0.1 mL/hour to 300 L/hour, preferably from 0.2 mL/hour to 30 L/hour, more preferably from 0.5 mL/hour to 15 L/hour, and particularly preferably from 1.0 mL/hour to 6 L/hour.

In the embodiments of the present invention, the concentration of a substrate (such as an organic pigment or a reaction component thereof) which flows in the channel, is generally in the range of 0.5 to 20 wt %, preferably in the range of 1.0 to 10 wt %.

In the method of the embodiments of the present invention for producing organic pigment fine-particles, a dispersing agent can be incorporated into the solution containing an organic pigment and/or an aqueous solution (aqueous medium) for changing the hydrogen ion exponent (pH). The dispersing agent has functions: (1) that the dispersing agent is rapidly adsorbed on the surface of the precipitated pigment, to form fine pigment particles, and (2) that these particles are prevented from aggregating again. In the embodiments of the present invention, as the dispersing agent, use can be made of an anionic, cationic, amphoteric, nonionic or pigmentary and low-molecular-weight or polymer dispersing agent. These dispersing agents may be used alone or in combination. Dispersing agents to be used in dispersion of the pigment are described in detail in "Dispersion Stabilization of Pigment and Surface Treatment Technique/Evaluation" (published by Japan Association for International Chemical Information, on December 2001), pp. 29-46.

Examples of the anionic dispersing agent (anionic surfactant) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylenealkylsulfates. N-acyl-N-alkyltaurine salts are particularly preferable. As the N-acyl-N-alkyltaurine salts, those described in Japanese Patent Application Publication No.3-273067 are preferable. These anionic dispersing agents may be used alone or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol, imidazolines derived from aliphatic acid, and salts of these cationic substances. These cationic dispersing agents may be used alone or in combination of two or more thereof.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkyl ethers, polyoxyethylenealkylaryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used alone or in combination of two or more thereof.

The pigmentary dispersing agent is defined as a dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene-or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

Specific examples of the polymer dispersing agent include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, methacrylic acid ester/methacrylic acid salt copolymers, styrene/itaconic acid salt copolymers, itaconic acid ester/itaconic acid salt copolymers, vinylnaphthalene/acrylic acid salt copolymers, vinylnaphthalene/methacrylic acid salt copolymers, vinylnaphthalene/itaconic acid salt copolymers, cellulose derivatives, and starch derivatives. Besides, natural polymers can be used, examples of which include alginic acid salts, gelatin, albumin, casein, gum arabic, gum tragacanth, and ligninsulfonic acid salts. Polyvinyl pyrrolidone is particularly preferable. These polymer dispersing agents may be used alone or in combination of two or more thereof.

Examples of a preferred embodiment include an embodiment in which the anionic dispersing agent is incorporated in the aqueous medium, and the nonionic dispersing agent and/or the polymer dispersing agent are(is) incorporated in the solution in which the organic pigment is dissolved.

The amount of the dispersing agent to be blended is preferably from 0.1 to 1,000 parts by mass, more preferably from 1 to 500 parts by mass, and further preferably from 10 to 250 parts by mass, to 100 parts by mass of the pigment, in order to further improve the uniform dispersibility and storage stability of the pigment. If the amount of the dispersing agent to be added is less than 0.1 parts by mass, the dispersion stability of the organic pigment fine particles may not be improved, in some cases.

The dispersion containing the organic pigment fine-particles produced as described above can be used by itself as pigment ink, and it can be used with various additives. Examples of the additive include drying preventives (humectants), color-fading preventives, emulsion-stabilizing agents, penetrating accelerants, ultraviolet absorbents, preservatives, mold preventives, pH adjustive agents, surface tension adjustive agents, defoamants, viscosity adjustive agents, dispersants, dispersion-stabilizing agents, rust preventives, and chelating agents.

(2) Measurement of Produced Organic Pigment Fine-particle in Particle Size

In the measuring method of fine particles, the average size of the group of the particles can be expressed by a numerical value. Examples of the numerical value which is widely used, include mode diameter, which shows the maximum value of the particle size distribution; medium diameter, which corresponds to the central value of the integration distribution curve thereof; and various average diameters (such as length average, area average, and weight average). The particle diameter size of the organic pigment fine-particles produced by the method of the embodiments of the present invention is arbitrary as far as the channel is not blocked. The particle diameter size is preferably 1 μm or less, more preferably from 3 nm to 800 nm, and particularly preferably from 5 nm to 500 nm in terms of the mode diameter.

Having a uniform particle size of fine-particles, i.e., having a monodisperse fine-particle system, is an important factor that affects performances of the particles, since not only it means that the particles included therein have uniform diameters but also it means that there is no fluctuation among particles in chemical composition and crystal structure inside the particles. In particular, this factor is regarded as important that governs the characteristics of the particles, in ultrafine-particles having nanometer order particle sizes. The method of the embodiments of the present invention is excellent not only it can control the size of particles but also it can obtain particles of uniform sizes. The arithmetic standard deviation is used as an index of having a uniform size. The arithmetic standard deviation of the pigment fine-particles produced according to the embodiments of the present invention is preferably 130 nm or less, particularly preferably 80 nm or less. The arithmetic standard deviation is obtained by subtracting the 16% particle diameter from the 84% particle diameter in the integrated distribution, and further dividing this difference by 2, in a method obtaining the standard deviation assuming that a particle size distribution be a normal distribution.

(3) Method for Producing Quinacridone Pigment Fine-particle as an Example of Organic Pigment Fine-particle The method of the embodiments of the present invention for producing an organic pigment can widely be applied to the above-mentioned pigments. Specifically, the method of producing an unsubstituted or substituted quinacridone pigment is described as an example hereinafter. In the embodiments of the present invention, an unsubstituted or substituted quinacridone pigment represented by the following Formula (I) is produced in an apparatus having a channel for forming laminar flow.

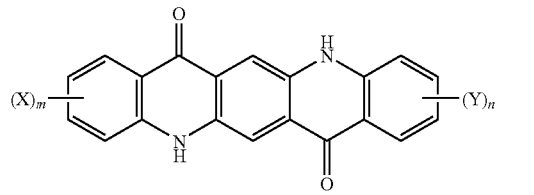

Formula (I)

First, the substituents in the Formula (I) are described. X and Y each independently represent a fluorine atom, a chlorine atom, an alkyl group having 1 to 3 carbon atoms, an alkoxy group having 1 to 3 carbon atoms, or a $COOR_a$ group (in which $R_a$ represents a hydrogen atom, or an alkyl group having 1 to 10 carbon atoms). Specifically, examples of the group represented by X and Y other than the fluorine atom, chlorine atom and carboxyl group, include an alkyl group, such as methyl, ethyl, propyl and isopropyl; an alkoxy group, such as methoxy, ethoxy, propyloxy and isopropoxy; and an alkoxycarbonyl group, such as methoxycarbonyl, ethoxycarbonyl, isopropoxycarbonyl and octyloxycarbonyl.

Preferably, X and Y each independently are a chlorine atom or an alkyl group, particularly preferably a methyl group.

The m and n each independently are 0, 1 or 2, particularly preferably 1.

Preferred specific examples of the quinacridone-series pigment to be synthesized, include an unsubstituted or substituted quinacridones, such as unsubstituted quinacridone, 2,9-dimethylquinacridone, and 4,11-dichloroquinacridone; and solid solutions thereof. When these are represented by C. I. numbers, the following are listed: Pigment Violet 19, Pigment Red 122, Pigment Red 207, Pigment Orange 48, Pigment Orange 49, Pigment Red 209, Pigment Red 206, Pigment Violet 42, and the like. However, the quinacridone-series pigment is not limited to these.

The production of the unsubstituted or substituted quinacridone pigment can be performed according to a usual synthesis process, preferably applying the process to the above-described apparatus or device having the channel with an equivalent diameter of 10 mm or less.

Examples of the solvent, which can be used in the embodiments of the present invention, include the above-mentioned organic solvent, dispersing agent, surfactant, or water, or the combination thereof. If necessary, for example, a water-soluble organic solvent which is added to an ink composition, and other components may be added to the solvent. As these solvent components, for example, constituents of pigment dispersing agents, as described in Japanese Patent Application Publication Nos. 2002-194263 and 2003-26972, can be used.

The reaction fluids may be fluids which are miscible with each other, or fluids which are immiscible with each other. Examples of the fluids miscible with each other include: solutions containing the same organic solvents; solutions containing organic solvents having relatively close natures; and a combination of a solution containing an organic solvent high in polarity, such as methanol, and water. Examples of the fluids immiscible with each other include a combination of a solution containing a solvent of low polarity, such as hexane, and a solution containing a solvent of high polarity, such as methanol.

In the case that a gas such as air or oxygen is used as an oxidizing agent, a method of dissolving the gas into the reaction fluid or introducing the gas into the channel can be taken. Preferably, the method of introducing the gas is taken.

The reaction temperature is preferably within the range in which the solvent is not solidified or vaporized, and it is preferably −20° C. to 250° C., more preferably 20° C. to 150° C., further preferably 40° C. to 120° C., and most preferably 60° C. to 100° C.

The flow velocity is advantageously 0.1 mL/hour to 300 L/hour, preferably 0.2 mL/hour to 30 L/hour, further preferably 0.5 mL/hour to 15 L/hour, and particularly preferably 1.0 mL/hour to 6 L/hour.

In the embodiments of the present invention, as the synthesis method of a quinacridone-series pigment which can be applied to a micro-reactor, various methods can be used, and any one of the processes can be applied. As the method of producing a quinacridone pigment according to the embodiments of the present invention, two reaction schemes are illustrated below as preferred examples. A quinacridone-series pigment can be produced in an apparatus having a channel whose equivalent diameter is preferably 10 mm or less, more preferably 1 mm or less.

A method of synthesizing a quinacridone compound by oxidizing reaction of 6,13-dihydroquinacridone (the following Scheme 1) is preferably a method using air or oxygen (see processes described in Japanese Patent Application Publication Nos. 11-209641 and 2001-115052, as reaction examples for reference), or a method using hydrogen peroxide (see a process described in Japanese Patent Application Publication No. 2000-226530, as a reaction example for reference), from the viewpoint of load to the environment.

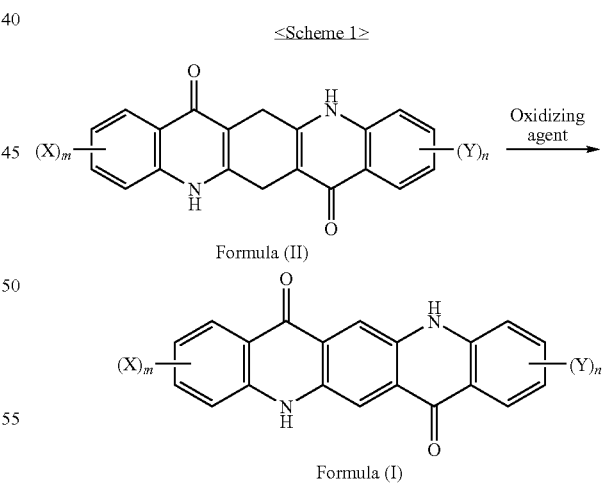

In Scheme 1, X, Y, m and n have the same meanings as those described above.

A ring-closing reaction of a diarylaminoterephthalic acid or an ester thereof (the following Scheme 2) is carried out by use of an appropriate condensing agent (see methods described in Japanese Patent Application Publication Nos. 2001-335577 and 2000-103980, as reaction examples for reference).

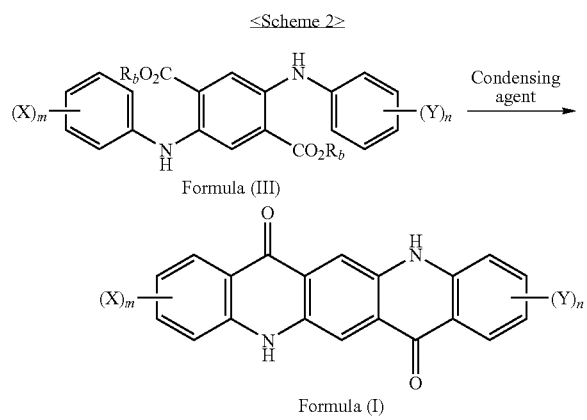

Scheme 2

Formula (III)

Formula (I)

In Scheme 2, X, Y, m and n have the same meanings as those described above. The substituent $R_b$ represents a hydrogen atom, or an alkyl, alkenyl, alkynyl or aryl group having 1 to 10 carbon atoms. Examples of the alkyl group include methyl, ethyl, propyl, and butyl groups. Examples of the alkenyl group include vinyl and allyl groups. Examples of the alkenyl group include an ethynyl group. Examples of the aryl group include a phenyl group. These substituents may further have a substituent. $R_b$ is preferably an aryl group, particularly preferably a phenyl group.

Examples of the solvent, which can be used in the production of the quinacridone-series pigment, include the organic solvent, dispersing agent, surfactant, or water, or the combination thereof. Specific examples thereof include ethers, such as tetrahydrofuran, dioxane, dimethoxyethane, and diglyme; esters, such as ethyl acetate, and butyl acetate; ketones, such as methyl ethyl ketone, 2-methyl-4-pentanone, and cyclohexanone; alcohols, such as ethanol, ethylene glycol, and diethylene glycol; nitriles, such as acetonitrile, and propionitrile; amide-series solvents, such as N,N-dimethylformamide, N,N-dimethylacetamide, N-methylpyrrolidone, and N,N-dimethylimidazolidone; and sulfur-containing solvents, such as dimethylsulfoxide, and sulfolane. Among these, amide-series solvents, dimethylsulfoxide, and sulfolane are preferable from the viewpoint of the solubility of the raw materials and products. If necessary, for example, a water-soluble organic solvent which is added to an ink composition, and other components may be added to the solvent. As these solvent components, for example, constituents of pigment dispersing agents, as described in Japanese Patent Application Publication Nos. 2002-194263 and 2003-26972, can be used. A desired ink is obtained by adding an appropriate additive(s) such as drying preventives (humectants), color-fading preventives, emulsion-stabilizing agents, penetrating accelerants, ultraviolet absorbents, preservatives, mold preventives, pH adjustive agents, surface tension adjustive agents, defoamants, viscosity adjustive agents, dispersants, dispersion-stabilizing agents, rust preventives, and chelating agents, to the ink composition.

The reaction fluids may be fluids which are miscible with each other, or fluids which are immiscible with each other. Examples of the fluids miscible with each other include: solutions containing the same organic solvents; solutions containing organic solvents having relatively close natures; and a combination of a solution containing an organic solvent high in polarity, such as methanol, and water. Examples of the fluids immiscible with each other include a combination of a solution containing a solvent of low polarity, such as hexane, and a solution containing a solvent of high polarity, such as methanol.

The quinacridone pigment obtained in the reaction is separated from the reaction solution by filtration or centrifugation, and then is sufficiently washed with an amide-series solvent, such as N,N-dimethylacetamide, thereby yielding the pigment with a high purity. Then, desired ink can be manufactured from the yielded quinacridone pigment fine particles.

The disazo-condensation-pigment can be similarly manufactured, and the detailed description thereof is omitted here.

EXAMPLES

The present invention will be described in more detail based on examples given below, but the present invention is not limited to these examples.

The pH values described in the following examples and comparative examples were measured with a glass electrode-type hydrogen ion concentration meter, HM-40V (trade name, measuring range: pH of 0 to 14) manufactured by TOA Electronics, Ltd. The particle diameter distributions were measured with a Microtrac UPA 150 (trade name) manufactured by Nikkiso Co., Ltd. For TEM measurement, a transmission electron microscopy JEM-2000FX (trade name) manufactured by JEOL, Ltd. was used.

Example 1

At room temperature, 1.5 g of 2,9-dimethylquinacridone was dissolved into 13.5 g of dimethylsulfoxide, 2.68 mL of a 5 mol/L aqueous sodium hydroxide solution, and 0.75 g of a dispersing agent, polyvinyl pyrrolidone (K30 (trade name), manufactured by Wako Pure Chemicals Industries, Ltd.). The resultant solution is designated to IA solution. The pH of the IA solution was over a measurable limit (pH: 14), and was unable to be measured. Separately, 0.75 g of a dispersing agent, sodium N-oleoyl-N-methyltaurine was mixed with 90 mL of distilled water. The resultant solution is designated to as IIA solution. The pH of the IIA solution was 7.70. These solutions each were passed through a micro-filter having pores of 0.45 μm diameter (manufactured by Fuji Photo Film Co., Ltd.), to remove impurities such as dust. Then, using a reactor, as illustrated in FIG. 18A, reaction was conducted according to the following procedure. Two PTFE (polytetrafluoroethylene) tubes with length 50 cm and equivalent diameter 1 mm were connected to two inlets of a PTFE Y-shaped connector with equivalent diameter 500 μm, each through a connector. Two syringes in which the IA solution or the IIA solution was put, respectively, were separately connected to the front tips of the two tubes, and the reactor was fitted to a pump. A PTFE tube with length 1 m and equivalent diameter 500 μm was connected to the outlet of the connector. The IA solution and the IIA solution were fed out at flow velocities of 1 mL/hour and 6 mL/hour, respectively. The inside of the channel was a laminar flow (Reynolds number: about 5.0), and a dispersion of 2,9-dimethylquinacridone was obtained. This dispersion was collected from the front tip of the tube, and is designated to as Sample 1 according to the embodiments of the present invention. The pH of the Sample 1 was 13.06. The mode diameter thereof was 120 nm, and the arithmetic standard deviation thereof was 58 nm.

Comparative Example 1

Separately, the IA solution was added to 6 mL of the IIA solution in a beaker, at room temperature, while stirring with a stirrer, to yield a dispersion of 2,9-dimethylquinacridone. This is designated to as Comparative sample 1. The particle diameters and the particle diameter distributions of the particles in the thus-obtained dispersions of the Sample 1 and the Comparative sample 1, were compared with each other, by use of the dynamic light scattering particle diameter measuring device. As a result, it was confirmed that the particle diameter and the particle diameter (size) distribution range of the particles in the dispersion of the Sample 1 were much smaller than those of the particles in the Comparative sample 1, which had a mode diameter of 144 nm and an arithmetic standard deviation of 77 nm.

Example 2

At room temperature, 0.15 g of 2,9-dimethylquinacridone was dissolved into 13.35 mL of dimethylsulfoxide, 1.65 mL of a 0.8 mol/L aqueous potassium hydroxide solution, and 0.75 g of polyvinyl pyrrolidone (K30, manufactured by Wako Pure Chemicals Industries, Ltd.). The resultant solution is designated to IB solution. The pH of the IB solution was over a measurable limit, and was unable to be measured. This IB solution and the IIA solution prepared in Example 1 were separately passed through a micro-filter having pores of 0.45 µm diameter (manufactured by Fuji Photo Film Co., Ltd.), to remove impurities such as dust, thereby yielding transparent solutions, respectively. Then, using a reactor described below, reaction was conducted according to the following procedure. Two PTFE tubes with length 50 cm and equivalent diameter 1 mm were connected to two inlets of a PTFE Y-shaped connector with equivalent diameter 500 µm, each through a connector. Two syringes in which the IB solution or the IIA solution was put, respectively, were separately connected to the front tips of the two tubes, and the reactor was fitted to a pump. A PTFE tube with length 1 m and equivalent diameter 500 µm was connected to the outlet of the connector. The IB solution and the IIA solution were fed out at flow velocities of 1.0 mL/hour and 30.0 mL/hour, respectively. The inside of the channel was a laminar flow (Reynolds number: about 21.9), and a dispersion of 2,9-dimethylquinacridone was obtained. This dispersion was collected from the front tip of the tube, and is designated to as Sample 2 according to the embodiments of the present invention. The pH of the Sample 2 was 10.49. This was measured by use of the dynamic light scattering particle diameter measuring device. As a result, the mode diameter of the particles in the dispersion was 51 nm, and the arithmetic standard deviation was 28 nm. Thus, it was confirmed that the distribution range of the dispersion particles was very narrow. Further, observation of the dispersion with the transmission electron microscope (TEM) showed that the particles had roundish particle shape.

Comparative Example 2

Separately, 0.5 mL of the IB solution was added to 3.0 mL of the IIA solution in a beaker, at room temperature, while stirring with a stirrer, to yield a dispersion of 2,9-dimethylquinacridone. This is designated to as Comparative sample 2. The pH of the Comparative sample 2 was 11.81. This was measured by use of the dynamic light scattering particle diameter measuring device. As a result, the mode diameter was 93 nm, and the arithmetic standard deviation was 57 nm. Thus, both of the particle diameter and the distribution range were conspicuously large. Further, observation of the dispersion with the transmission electron microscope (TEM) showed that the particles were in the form of needle.

Comparative Example 3

A dispersion was obtained in the same manner as in Example 2, except that all of the equivalent diameters of the PTFE tubes and the PTFE Y-shaped connector that were used in the reactor in Example 2 were set to 20 mm, and that the IB solution and the IIA solution were fed out at feeding flow velocities of 26.49 L/hr and 122.4 L/hr, respectively. The flow inside the channel (Reynolds number: about 2639.6) was unstable. This is designated to as Comparative sample 3. The pH of the Comparative sample 3 was 12.56. This was measured by use of the dynamic light scattering particle diameter measuring device. As a result, the mode diameter was 277 nm, and the arithmetic standard deviation was 140 nm. Thus, it was confirmed that the particle diameter was conspicuously large and the distribution range was conspicuously wide.

The comparison of the Sample 2 according to the embodiments of the present invention with the Comparative sample 2 showed that by preparing pigment particles in the channel, the mode diameter of the particles and the distribution range thereof were made quite small and narrow, and the particle diameters thereof were made uniform. The comparison of the Sample 2 according to the embodiments of the present invention with the Comparative sample 3 showed that the mode diameter of the particles was made quite small and the distribution range was made considerably narrow when the equivalent diameter of the channel was 10 mm or less, in particular, in a micro-scale.

Example 3

At room temperature, 0.01 g of 2,9-dimethylquinacridone was dissolved into 10.0 mL of dimethylsulfoxide, 0.11 mL of a 0.8N aqueous potassium hydroxide solution, and 0.05 g of polyvinyl pyrrolidone (K30, manufactured by Wako Pure Chemicals Industries, Ltd.). The resultant solution is designated to IC solution. The pH of the IC solution was over a measurable limit, and was unable to be measured. The IC solution was passed through a micro-filter having pores of 0.45 µm diameter (manufactured by Fuji Photo Film Co., Ltd.), to remove impurities such as dust, thereby yielding a transparent solution. In the reactor, as illustrated in FIG. 18A, which had a Y-shaped channel made of glass and had a channel width A of 100 µm, a channel width B of 100 µm, a channel width C of 100 µm, a channel length F of 12 cm, and a channel depth H of 40 µm, two PTFE tubes were connected to the introducing port 1011 and the introducing port 1012, each through a connector. Then, two syringes in which the IC solution or distilled water was put, respectively, were separately connected to the front tips of the two tubes, and the reactor was fitted to a pump.

A PTFE tube was connected to the discharge port 1014 also through a connector. The IC solution and the distilled water were fed out at flow velocities of 20 µL/min and 20 µL/min, respectively. The inside of the channel was a laminar flow (Reynolds number: about 8.5), and a dispersion of 2,9-dimethylquinacridone was obtained. This was collected from the front tip of the tube. The pH of the thus-obtained dispersion was 13.93. This was measured by use of the dynamic light scattering particle diameter measuring device. As a result, the mode diameter of the particles in the dispersion was 50 nm.

Example 4

Using the reactor, as illustrated in FIG. 19A, which had a cylindrical channel having a channel diameter D of 200 μm, a channel diameter E of 620 μm, and a channel length G of 10 cm, two PTFE tubes were connected to the introducing port 1021 and the introducing port 1022, each through a connector. Then, two syringes in which the IB solution or the IIA solution, as prepared in Examples 1 and 2, was put, respectively, were separately connected to the front tips of the tubes, and the reactor was fitted to a pump. The IB solution and the IIA solution were fed out at flow velocities of 1.0 mL/hour and 30.0 mL/hour, respectively. The inside of the channel was a laminar flow (Reynolds number: about 17.7), and a dispersion of 2,9-dimethylquinacridone was obtained. This was collected from the discharge port 1024. The pH of the dispersion was 10.44. This was measured by use of the dynamic light scattering particle diameter measuring device. As a result, the mode diameter of the particles in the dispersion was 94 nm, and the arithmetic standard deviation was 77 nm. Thus, it was confirmed that the distribution range thereof was very narrow.

Reference Example 1

At room temperature, 0.01 g of 2,9-dimethylquinacridone was added to 10 mL of dimethylsulfoxide, 0.04 mL of a 0.8 mol/L aqueous potassium hydroxide solution, and 0.05 g of polyvinyl pyrrolidone (K30, manufactured by Wako Pure Chemicals Industries, Ltd.). The resultant liquid is designated to ID liquid. The pH of the ID liquid was 12.74. The ID liquid was suspended, but the ID liquid was used as it was, without passing through a micro-filter having pores of 0.45 μm diameter (manufactured by Fuji Photo Film Co., Ltd.). In the reactor, as illustrated in FIG. 18A, which had a Y-shaped channel made of glass and had a channel width A of 100 μm, a channel width B of 100 μm, a channel width C of 100 μm, a channel length F of 12 cm, and a channel depth H of 40 μm, two PTFE tubes were connected to the introducing port 1011 and the introducing port 1012, each through a connector. Then, two syringes in which the ID liquid or the IIA solution as prepared in Example 1 was put, respectively, were separately connected to the front tips of the tubes, and the reactor was fitted to a pump. A PTFE tube was connected to the discharge port 1014 also through a connector. The ID liquid and the IIA solution were fed out at flow velocities of 20 μL/min and 20 μL/min, respectively. As a result, at the confluent position where the ID liquid and the IIA solution were combined together, the channel was blocked. It is understood from this fact that in the method of the embodiments of the present invention using a reactor having a Y-shaped channel, it is important to use a homogenous solution in which the pigment is dissolved.

Reference Example 2

In the reactor, as illustrated in FIG. 19A, which had a cylindrical channel having a channel diameter D of 200 μm, a channel diameter E of 620 μm, and a channel length G of 10 cm, two PTFE tubes were connected to the introducing port 1021 and the introducing port 1022, each through a connector. Then, two syringes in which the ID liquid as prepared in Reference example 1 or the IIA solution as prepared in Example 1 was put, respectively, were separately connected to the front tips of the tubes, and the reactor was fitted to a pump. The ID liquid and the IIA solution were fed out at feeding flow velocities of 1.0 mL/hour and 30.0 mL/hour, respectively. As a result, at the confluent position where the ID liquid and the IIA solution were combined, the channel was gradually blocked. It is understood from this fact that in the method of the embodiments of the present invention using a reactor having a cylindrical channel also, it is important to use a homogenous solution in which the pigment is dissolved.

Example 5

In the reactor capable of separating flows to its discharge ports, as illustrated in FIG. 20A, which had a Y-shaped channel having a channel width I of 100 μm, a channel width J of 100 μm, a channel width K of 100 μm, a channel width L of 100 μm, a channel width M of 100 μm, a channel length Q of 2 cm, and a channel depth S of 40 μm, two PTFE tubes were connected to the introducing port 1031 and the introducing port 1032, each through a connector. Then, two syringes in which the IB solution prepared in Example 3 or the IIA solution prepared in Example 1 was put, respectively, were separately connected to the front tips of the tubes, and the reactor was fitted to a pump. PTFE tubes were connected through connectors to the discharge ports 1034 and 1035 also. The IB solution was fed out at a feeding flow velocity of 10 μL/min through an introducing channel 1033a, and the IIA solution was fed out at a feeding flow velocity of 60 μL/min through an introducing channel 1033b, respectively, to yield a dispersion layer of 2,9-dimethylquinacridone as laminar flow (Reynolds number: about 14.9) in a reaction channel 1033c. In FIG. 20A, 1033d is a confluent point of the flows. At a fluid separating point 1033e, the dispersion layer and the other solution layer were able to be separated such that the dispersion layer would be led to the discharge port 1034 through a discharging channel 1033f and that the other solution layer would be led to the discharge port 1035 through a discharging channel 1033g. This process made it possible to obtain the dispersion having a high concentration. The pH of the sample obtained from the discharge port 1034 was 12.46, and the pH of the sample obtained from the discharge port 1035 was 11.74.

Example 6

In the reactor capable of separating flows to its discharge ports, as illustrated in FIG. 21, which had a cylindrical channel having a channel diameter N of 100 μm, a channel diameter P of 300 μm, a channel diameter O of 100 μm, and a channel length R of 5 cm, two PTFE tubes were connected to the introducing port 1041 and the introducing port 1042, each through a connector. Then, two syringes in which the IC solution prepared in Example 3 or the IIA solution prepared in Example 1 was put, respectively, were separately connected to the front tips of the tubes and the reactor was fitted to a pump. PTFE tubes were connected through connectors to the discharge ports 1044 and 1045 also. The ID solution was fed out at a feeding flow velocity of 10 μL/min through an introducing channel 1043b, and the IIA solution was fed out at a feeding flow velocity of 30 μL/min through an introducing channel 1043a, respectively, to yield a dispersion of 2,9-dimethylquinacridone as cylindrical laminar flow (Reynolds number: about 2.83) in a reaction channel 1043c. In FIG. 21, 1043d is a confluent point of the flows. At a fluid separating point 1043e, the cylindrical laminar flow containing the dispersion were able to be separated from the other solution such that the cylindrical laminar flow would be led to the discharge port 1045 through a discharging channel 1043f and that the other solution would be led to the discharge port 1044 through a discharging channel 1043g. This process made it possible to yield the dispersion having a high concentration even if the cylindrical tube micro-reactor was used.

Comparative Example 4

A IE solution was obtained, by removing polyvinyl pyrrolidone (K30, manufactured by Wako Pure Chemicals Industries, Ltd.) and sodium N-oleoyl-N-methyltaurine from the IB solution in Example 2. The experiment was carried in the same manner as in Example 2, except that the IE solution instead of the IB solution, and the distilled water were fed at flow velocities of 1.0 mL/hr and 6.0 mL/hr, respectively, without changing the PTFE Y-shaped connector, the PTFE tubes and other members in the reactor utilized in Example 2. The thus-obtained dispersion was measured by use of the dynamic light scattering particle diameter measuring device. As a result, the mode diameter of the particles in the dispersion was 2.80 μm, and the arithmetic standard deviation was 0.89 μm. Thus, both of the particle diameter and the arithmetic standard deviation were very large. These results demonstrate that a dispersing agent is preferable in the embodiments of the present invention, to obtain fine particles of nanometer size.

Example 7

At room temperature, 1.0 g of Pigment Yellow 93 was dissolved into 10.0 g of dimethylsulfoxide, 1.3 mL of a 5 mol/L aqueous sodium hydroxide solution, and 0.5 g of a dispersing agent, polyvinyl pyrrolidone (K30, manufactured by Wako Pure Chemicals Industries, Ltd.). The resultant solution is designated to IF solution. Separately, 0.5 g of a dispersing agent, sodium N-oleoyl-N-methyltaurine was mixed with 60 mL of distilled water. The resultant solution is designated to as IIB solution. These solutions were separately passed through a micro-filter having pores of 0.45 μm diameter (manufactured by Fuji Photo Film Co., Ltd.), to remove impurities such as dust. Then, using a reactor described below, reaction was conducted according to the following procedure. Two PTFE tubes with length 50 cm and equivalent diameter 1 mm were connected to two inlets of a PTFE Y-shaped connector with equivalent diameter 500 μm, each through a connector. Two syringes in which the IF solution or the IIB solution was put, respectively, were separately connected to the front tips of the tubes, and the reactor was fitted to a pump. A PTFE tube with length 1 m and equivalent diameter 500 μm was connected to the outlet through a connector. The IF solution and the IIB solution were fed out at flow velocities of 1 mL/hr and 6 mL/hr, respectively, to obtain a dispersion layer of Pigment Yellow 93 as laminar flow (Reynolds number: about 4.9) inside the channel. This was collected from the front tip of the tube, and is designated to as Sample 3 according to the embodiments of the present invention. In this case, the mode diameter was 133 nm, and the arithmetic standard deviation was 69 nm.

Comparative Example 5

Separately, the IF solution was added to 6 mL of the IIB solution, at room temperature, while stirring with a stirrer, to yield a dispersion of Pigment Yellow 93. This is designated to as Comparative sample 4.

The pigment particle diameters of the Sample 3 and the Comparative sample 4 were compared with each other, by use of the dynamic light scattering particle diameter measuring device. As a result, it was confirmed that the particle diameter and the particle diameter distribution range of the particles in the dispersion of the Sample 3 were much smaller than those of the Comparative sample 4, which had a mode diameter of 189 nm and an arithmetic standard deviation of 98 nm.

Example 8

A pigment dispersion was obtained in the same manner as in Example 4, except that 2,9-dimethylquinacridone in the IB solution was changed to an equimolar amount of Pigment Yellow 93. The observation of the thus-obtained dispersion with the transmission electron microscope (TEM) showed that the particles in the dispersion had roundish particle shapes having an average particle diameter of 12 nm in terms of primary particles.

Example 9

A pigment dispersion was obtained in the same manner as in Example 4, except that 2,9-dimethylquinacridone in the IB solution was changed to an equimolar amount of Pigment Red 254. The observation of the thus-obtained dispersion with the transmission electron microscope (TEM) showed that the particles in the dispersion also had roundish particle shapes having an average particle diameter of 9 nm in terms of primary particles.

Example 10

At room temperature, 1.2 g of Pigment Blue 15 (manufactured by Tokyo Kasei Kogyo Co., Ltd.) was dissolved into 10 mL of 95% sulfuric acid, to prepare a IG solution. Separately, 6.0 g of polyvinyl pyrrolidone (K30, manufactured by Wako Pure Chemicals Industries, Ltd.), 6.0 g of sodium N-oleoyl-N-methyltaurine, and 240 mL of distilled water were mixed, to prepare a IIC solution. These solutions were separately passed through a micro-filter having pores of 0.45 μm diameter to remove impurities such as dust, to yield transparent solutions, respectively. A dispersion was prepared in the same manner as in Example 4, except that the IB solution used in Example 4 was changed to the IG solution, and that the IIA solution was changed to the IIC solution. The observation of the thus-obtained dispersion with the transmission electron microscope (TEM) showed that the particles in the dispersion had roundish particle shapes having an average particle diameter of 15 nm in terms of primary particles.

Example 11

Synthesis of 2,9-dimethylquinacridone by Oxidization Reaction

To 2.0 g of 2,9-dimethyl-6,13-dihydroquinacridone, were added 10.0 mL of a 5 mol/L aqueous sodium hydroxide solution, and 18 g of polyethylene glycol 400, and the resultant mixture was stirred at room temperature. The resultant solution, the color of which was deep green, is referred to as Solution A. The Solution A was fed at a flow velocity of 3.0 mL/hr by use of a syringe pump. Separately, as Solution B, a 30 wt % aqueous hydrogen peroxide solution was fed at a flow velocity of 0.5 mL/hr, by use of a syringe pump. These Solutions A and B were fed to a micro-mixer (channel width, 45 μm; depth, 200 μm) manufactured by IMM Co., and then mixed in a micro-space therein. At the discharge port of the micro-mixer, the production of a dispersion having a vivid magenta color was observed. The dispersion was analyzed, and it was proved that 2,9-dimethylquinacridone having a purity of 96% or more was produced.

Comparative Example 6

To 2.0 g of 2,9-dimethyl-6,13-dihydroquinacridone, were added 10.0 mL of a 5N aqueous sodium hydroxide solution, and 18 g of polyethylene glycol 400, and the resultant mixture was stirred at room temperature. To the resultant solution, the color of which was deep green, was dropwise added 2.0 mL of a 30 wt % aqueous hydrogen peroxide solution, and then the resultant solution was stirred at 60° C. for 1 hour, and cooled to room temperature. The resultant was analyzed, and it was proved that the conversion ratio of the starting material was 80%, and that 2,9-dimethylquinacridone having a pigment purity of 94% or more was produced.

Example 12

Synthesis of 2,9-dimethylquinacridone by Dehydration Condensation

A solution was prepared by mixing 2.0 g of 2,5-di-(p-toluidino)-terephthalic acid, 0.1 g of p-toluenesulfonic acid, 15 mL of ethylene glycol, and 20 mL of dimethylformamide. A fused silica glass capillary (equivalent diameter, 0.20 mm; and length, 4.0 m) was provided as a reactor, and was fixed in such a manner that a portion of 2.5 m length out of the whole capillary was immersed in an oil bath. The oil bath was heated to 150° C., and this solution was fed into the reactor at a flow velocity of 1.1 mL/hr (retention time: 5 minutes) with a syringe pump. A pigment having a vivid magenta color was obtained from the discharge port of the capillary.

Comparative Example 7

A solution was prepared by mixing 2.0 g of 2,5-di-(p-toluidino)-terephthalic acid, 0.1 g of p-toluenesulfonic acid, 15 mL of ethylene glycol, and 20 mL of dimethylformamide. An oil bath was heated to 150° C. to heat the solution in a 50 mL flask. The solution was stirred for 30 minutes. The thus-produced pigment was analyzed, and it was proved that the starting materials remained slightly.

Example 13

Production of C.I. Pigment Yellow 93 by Amidation Reaction

Into 20 mL of dimethylformamide, were dissolved 0.3 g of the phenyl ester derivative (A) and 0.1 g of 3-chloro-2-methylanilin. A fused silica glass capillary (equivalent diameter, 0.53 mm; and length, 1.5 m) was provided as a micro-reactor, and was fixed in such a manner that a portion of 1.0 m length out of the whole capillary was immersed in an oil bath. The oil bath was heated to 150° C., and this solution was fed into the reactor at a flow velocity of 2.2 mL/hour (retention time: 6 minutes), with a syringe pump. A pigment came out from the discharge port of the capillary, had a vivid yellow color. The pigment was analyzed, and it was proved that the purity thereof was 95% or more.

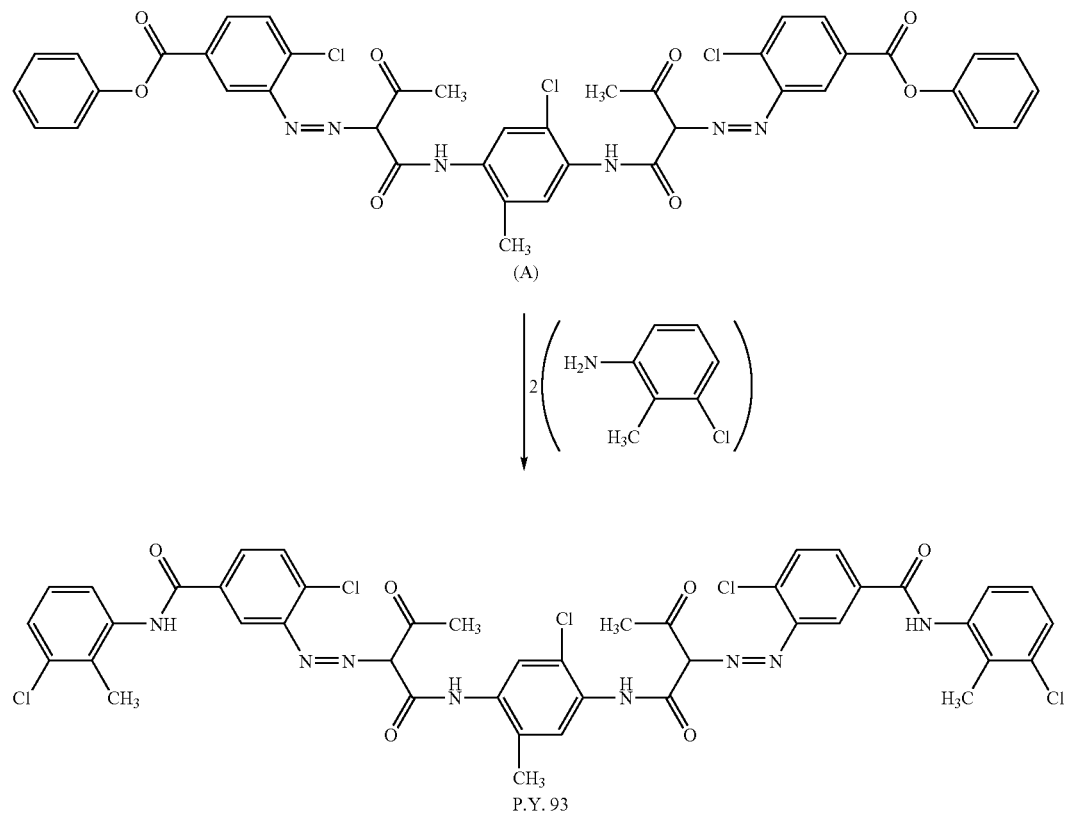

(A)

P.Y. 93

Comparative Example 8

Into 20 mL of dimethylformamide, were dissolved 0.3 g of the phenyl ester derivative (A) and 0.1 g of 3-chloro-2-methylaniline. An oil bath was heated to 150° C. to heat this solution in a 50 mL flask. The solution was stirred for 1 hour. The thus-produced pigment was analyzed, and it was proved that the conversion ratio was 65%, and that the pigment had a pigment purity of 93% or less, and had a slightly dim (darkened) yellow.

Example 14

Production of C.I. Pigment Red 214 by Amidation Reaction

Into 50 mL of dimethylsulfoxide, were dissolved 1.0 g of the phenyl ester derivative (B) and 0.2 g of 2,5-dichloro-1,4-phenylenediamine. A fused silica glass capillary (equivalent diameter, 0.53 mm; length, 1.5 m) was provided as a microreactor, and was fixed in such a manner that a portion of 1.0 m length out of the whole capillary was immersed in an oil bath. The oil bath was heated to 150° C., and this solution was fed into the reactor at a flow velocity of 3.3 mL/hour (retention time: 4 minutes), with a syringe pump. A pigment came out from the discharge port of the capillary, had a vivid red color. The pigment was analyzed, and it was proved that the purity thereof was 96% or more.

μm diameters. The resultant filtrate is called a IH solution. Further, a colorless transparent solution prepared into 50 mL by dissolving 0.5 g (1.17 mmol) of a sodium salt of N-oleoyl-N-methyltaurine in distilled water, was filtrated with a microfilter for aqueous solvent (manufactured by Sartorius Co.), made of a cellulose ester and having pores of 0.45 μm. The resultant filtrate is called an IID solution.

A jacket capable of circulating a coolant was fitted to a reactor having a cylindrical channel and having a channel diameter D of 100 μm, a channel diameter E of 400 μm and a channel length G of 20 cm, as illustrated in FIG. 19A, so that the portion along the channel length G would be cooled to 5° C. Two PTFE tubes were connected to the introducing ports 1021 and 1022, each through a connector.

A syringe in which a mixed solution of the IG solution and the IH solution at a ratio by volume of IG:IH of 1:2 was put, was connected to the introducing port 1021, and the syringe was set to a syringe pump. A syringe in which the IID was put, was connected to the introducing port 1022, and the syringe was set to a syringe pump. The solutions were sent out at solution-sending speeds of 1.0 mL/hr and 10.0 mL/hr from

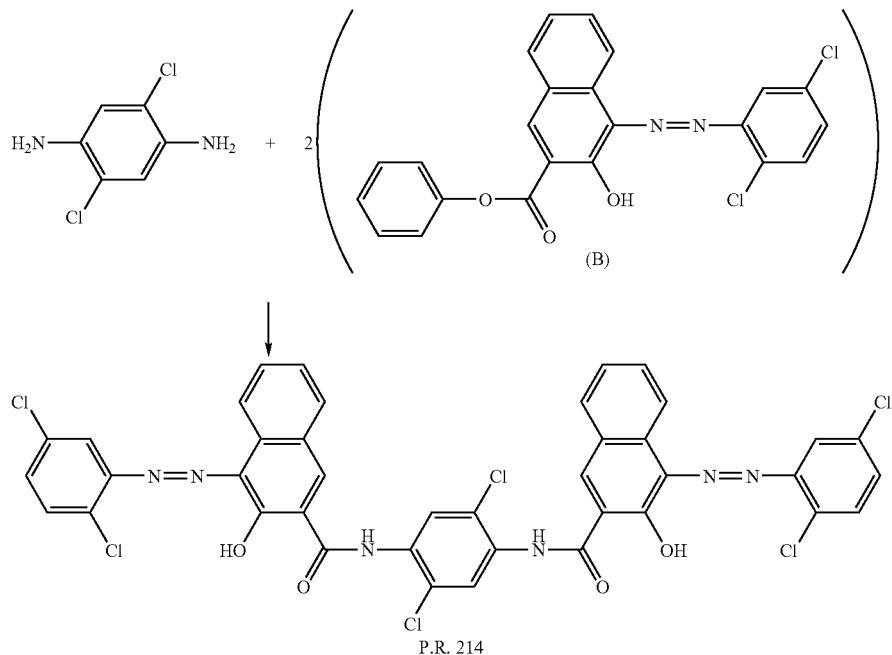

Example 15

Synthesis of Fine Particles of a Phthalocyanine Pigment (Pigment Blue 16)

A dark green solution prepared into 50 mL by dissolving 2.5 g (0.45 mL) of a disodium salt of phthalocyanine (manufactured by Tokyo Kasei Kogyo Co., Ltd.) in dimethylsulfoxide (DMSO), was filtrated with a micro-filter (manufactured by Advantec Co., Ltd.), made of PTFE and having pores of 0.5 μm diameters. The resultant filtrate is called as a IG solution. Then, a colorless transparent solution prepared into 50 mL by dissolving 0.5 g of polyvinyl pyrrolidone (PVP, K-90 (trade name), manufactured by Wako Pure Chemicals Industries, Ltd., average molecular weight of 360,000) in DMSO, was filtrated with a micro-filter (manufactured by Advantec Co., Ltd.), made of PTFE and having pores of 0.5 the introducing portions 1021 and 1022, respectively. As a result, the flow in the channel cooled to 5° C. became a laminar flow (Reynolds number: about 9.8), and a dispersion of phthalocyanine was yielded. This dispersion was then collected from a discharge port 1024. This was measured by use of a dynamic light scattering particle diameter measuring device. As a result, the mode diameter of the particles in the dispersion was 17.4 nm, and the arithmetic standard deviation thereof was 8.6 mm. Thus, the resultant dispersion had a quite small particle diameter and a very narrow distribution width.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:
a recording head which ejects droplets of a liquid onto a recording medium, the liquid containing fine particles of an organic pigment manufactured by the steps of: flowing a solution of an organic pigment dissolved in an alkaline or acidic aqueous medium through a channel which provides a laminar flow; and changing a hydrogen ion exponent (pH) of the solution in a course of the laminar flow;
a droplet ejection control device which controls a droplet ejection timing of the recording head; and
a conveyance device which relatively moves the recording medium and the recording head in a relative conveyance direction,
wherein when the recording head performs ejection of a first droplet to form a first dot on the recording medium and then performs ejection of a second droplet to form a second dot overlapping with the first dot on the recording medium, the droplet ejection control device controls the droplet ejection timing of the recording head by taking a droplet diameter change time until a diameter of the first droplet deposited on a surface of the recording medium reaches $D1b$ satisfying the following inequality as a droplet ejection time interval between the ejection of the first droplet and the ejection of the second droplet:

$$D1b < 2 \times Pt - D2a,$$

where $Pt$ is an interval between the first dot and the second dot on the surface of the recording medium, $D2a$ is a diameter of the second droplet upon landing on the surface of the recording medium, and $D1b$ is the diameter of the first droplet on the surface of the recording medium when the second droplet lands on the surface of the recording medium.

2. The image forming apparatus as defined in claim 1, further comprising: a droplet ejection condition calculating device which determines the diameter $D1b$ of the first droplet satisfying the inequality:

$$D1b < 2 \times Pt - D2a,$$

with respect to the interval $Pt$ between the first dot and the second dot on the surface of the recording medium, and the diameter $D2a$ of the second droplet upon landing on the surface of the recording medium; and
a droplet diameter change time calculating device which determines the droplet diameter change time from a time at which the first droplet lands on The surface of the recording medium until the diameter of the first droplet on the surface of the recording medium reaches $D1b$.

3. The image forming apparatus as defined in claim 2, wherein when a mixed pattern including a plurality of combinations of the interval between the first dot and the second dot, the first dot diameter and the second dot diameter, is to be formed within one image on the recording medium, the droplet diameter change time calculating device calculates a plurality of values for the droplet diameter change time, and the droplet ejection control device controls a recording timing for the image by using a representative value of the plurality of droplet ejection diameter change time values.

4. The image forming apparatus defined in claim 3, wherein the representative value of the droplet diameter change time includes at least a value not less than a maximum value of the plurality of droplet diameter change time values calculated by the droplet diameter change time calculating device.

5. The image forming apparatus as defined in claim 2, further comprising:
an information supply device which supplies information containing at least one of information relating to a type of the liquid and information relating to a type of the recording medium,
wherein the droplet diameter change time calculating device calculates the droplet diameter change time according to the information supplied by the information supply device.

6. The image forming apparatus as defined in claim 2, wherein:
the droplet diameter change time calculating device determines a first droplet diameter change time in a main scanning direction substantially orthogonal to the relative conveyance direction, and a second droplet diameter change time in a sub-scanning direction being the relative conveyance direction, according to the interval between the first dot and the second dot in the main scanning direction, and the interval between the first dot and the second dot in the sub-scanning direction; and
the droplet ejection control device controls the droplet ejection timing by taking the first droplet diameter change time and the second droplet diameter change time as a droplet ejection time interval in the main scanning direction and a droplet ejection time interval in the sub-scanning direction, respectively.

7. The image forming apparatus as defined in claim 1, wherein the droplet ejection control device controls the droplet ejection timing by means of one droplet ejection time interval within one image.

8. The image forming apparatus as defined in claim 1, wherein the recording head is a line head in which a plurality of nozzles are arranged over a length corresponding to a full width of the recording medium.

9. The image forming apparatus as defined in claim 8, wherein:
the recording head comprises a first nozzle row having nozzles for ejecting droplets forming odd-numbered dots of dots formed in a direction substantially orthogonal to the relative conveyance direction, and a second nozzle row having nozzles for ejecting droplets forming even-numbered dots of the dots; and
the image forming apparatus further comprises an interval changing device which changes an interval between the first nozzle row and the second nozzle row according to the droplet ejection control in the relative conveyance direction.

10. The image forming apparatus as defined in claim 1, wherein the recording head is a serial head in which a plurality of nozzles are arranged over a length shorter than a full width of the recording medium, and the recording head comprises a moving device which relatively moves the recording head and the recording medium in a direction in which the plurality of nozzles are arranged.

11. The image forming apparatus as defined in claim 10, wherein:
the recording head comprises a first nozzle row having nozzles for ejecting droplets forming odd-numbered dots of dots formed in a direction substantially orthogonal to the relative conveyance direction, and a second nozzle row having nozzles for ejecting droplets forming even-numbered dots of the dots; and
the image forming apparatus further comprises an interval changing device which changes an interval between the first nozzle row and the second nozzle row according to the droplet ejection control in the direction substantially orthogonal to the relative conveyance direction.

* * * * *